(12) United States Patent
Wang et al.

(10) Patent No.: US 11,416,394 B2
(45) Date of Patent: Aug. 16, 2022

(54) MEMORY MANAGEMENT METHOD, APPARATUS, AND SYSTEM

(71) Applicant: Huawei Technologies Co., Ltd., Shenzhen (CN)

(72) Inventors: Yuelong Wang, Beijing (CN); Xinzhu Wang, Beijing (CN); Zhiguo Tu, Beijing (CN); Shaohua Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/117,622

(22) Filed: Dec. 10, 2020

(65) Prior Publication Data

US 2021/0089445 A1  Mar. 25, 2021

Related U.S. Application Data

(63) Continuation of application No. PCT/CN2018/090912, filed on Jun. 12, 2018.

(51) Int. Cl.
*G06F 12/06* (2006.01)
*G06F 13/24* (2006.01)
*H04B 1/3827* (2015.01)

(52) U.S. Cl.
CPC .......... *G06F 12/0646* (2013.01); *G06F 13/24* (2013.01); *H04B 1/3827* (2013.01); *G06F 2212/1041* (2013.01)

(58) Field of Classification Search
CPC ............... G06F 12/0646; G06F 13/24; G06F 2212/1041; G06F 12/02; G06F 12/06; G06F 12/063; G06F 12/0653; H04B 1/3827
See application file for complete search history.

(56) References Cited

U.S. PATENT DOCUMENTS 7,565,454 B2 *  7/2009  Zuberi ............... H04L 67/1097
                                                      709/250
9,128,849 B2 *  9/2015  Hendry ............... G06F 12/0835
(Continued)

FOREIGN PATENT DOCUMENTS

CN      101859263 A    10/2010
CN      105452986 A     3/2016
(Continued)

OTHER PUBLICATIONS

Mamagkakis, S., et al., "Energy-Efficient Dynamic Memory Allocators at the Middleware Level of Embedded Systems", EMSOFT '06: Proceedings of the 6th ACM & IEEE International conference on Embedded software, Oct. 22-25, 2006, 8 Pages, Seoul, Korea.

*Primary Examiner* — Farley Abad
*Assistant Examiner* — Richard B Franklin
(74) *Attorney, Agent, or Firm* — Slater Matsil, LLP

(57) ABSTRACT

A memory management method, apparatus, and system are provided. The memory management method is performed by a memory management hardware accelerator, and the memory management hardware accelerator is coupled to an application subsystem and a communications subsystem. The application subsystem is configured to run a main operating system, and the communications subsystem is configured to run a communications operating system. The method includes: obtaining a set of memory addresses corresponding to dynamic memory space allocated by the main operating system to the communications subsystem, where the set of memory addresses includes one or more memory addresses; and sending some memory addresses in the set of memory addresses to a component of the communications subsystem.

21 Claims, 11 Drawing Sheets

(56) References Cited

U.S. PATENT DOCUMENTS

| | | | |
|---|---|---|---|
| 2008/0028181 A1* | 1/2008 | Tong | G06F 3/14 |
| | | | 711/207 |
| 2011/0161620 A1* | 6/2011 | Kaminski | G06F 12/1009 |
| | | | 711/207 |
| 2013/0215745 A1 | 8/2013 | Shubhakoti et al. | |
| 2017/0123971 A1 | 5/2017 | Kanaujia et al. | |

FOREIGN PATENT DOCUMENTS

| | | | |
|---|---|---|---|
| CN | 105786612 A | 7/2016 |
| JP | H0291343 A | 3/1990 |
| JP | 2005044353 A | 2/2005 |
| JP | 2015524979 A | 8/2015 |

\* cited by examiner

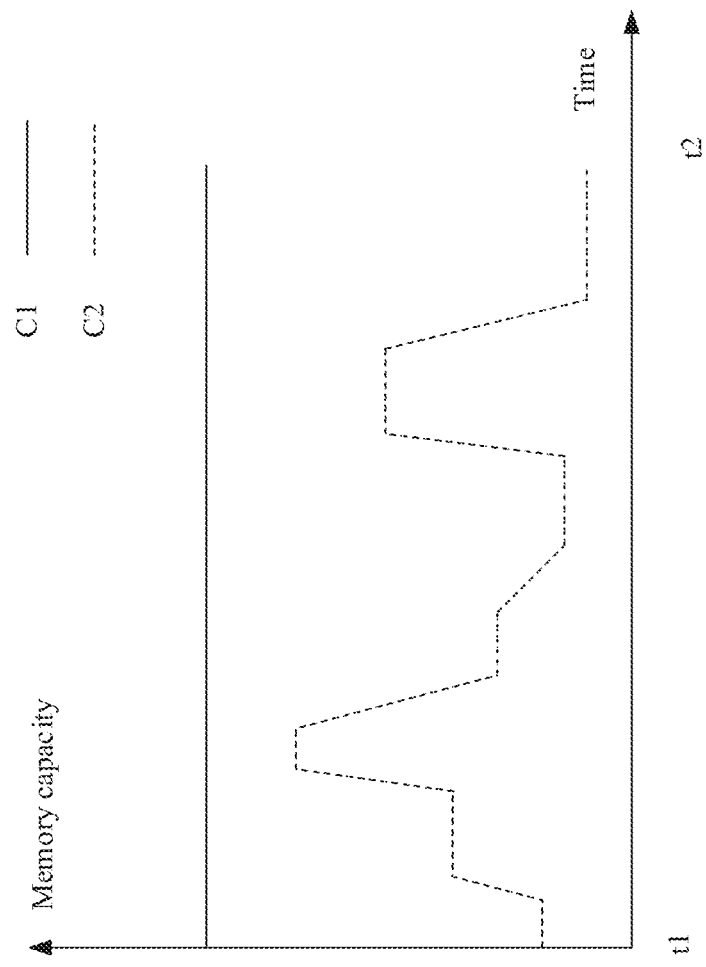
FIG. 6
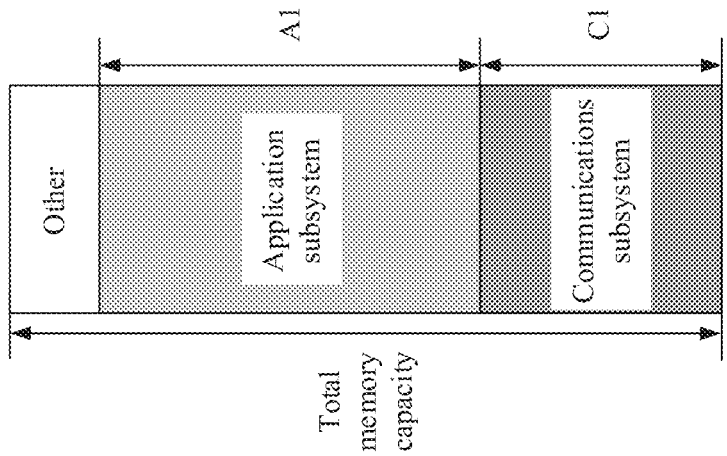

MEMORY MANAGEMENT METHOD, APPARATUS, AND SYSTEM

CROSS-REFERENCE TO RELATED APPLICATIONS

This application is a continuation of International Application No. PCT/CN2018/090912, filed on Jun. 12, 2018, the disclosure of which is hereby incorporated by reference in its entirety.

TECHNICAL FIELD

This application relates to the field of electronic technologies, and in particular, to a memory management method, apparatus, and system.

BACKGROUND

In the modern society, computing devices are everywhere, from small computing devices such as a mobile phone, a personal computer, and a smartwatch to large computing devices such as a server, a switch, and a base station. These computing devices may usually be abstracted as a computer system. The computer system not only includes hardware components such as a processor and a memory, but also includes software components such as an operating system and an application.

With evolution of technologies, a computing device can provide increasingly rich functions. Mobile phones are used as an example. From early feature phones to today's smartphones, a multimedia processing capability of a mobile phone is continuously enhanced, and a highest mobile communication rate supported by a mobile phone is also continuously increased. Advance of these basic technologies provides a solid foundation for vigorous development of the mobile internet industry, greatly enriching people's communication and life.

In addition, structures of the computing devices are becoming more complex. In one aspect, an operating system (OS) of a mobile phone platform evolves from an early Symbian operating system to a current Android operating system and an iPhone operating system (iOS). These new operating systems are open to third-party software, giving birth to a rich variety of mobile applications (Apps). In another aspect, to support a stronger multimedia processing capability and a higher mobile communication rate, a system structure of a mobile phone is continuously evolving, and includes a main computing system with a stronger specification, a multi-mode convergence communications subsystem, and a large-capacity multi-cache storage subsystem.

A memory capacity and an access rate are critical to performance of a computing device. Therefore, it is necessary to provide a memory management solution that is more suitable for application requirements.

SUMMARY

Embodiments of this application provide a memory management method, apparatus, and system, to improve performance of a computing device or reduce costs of a computing device.

It should be understood that, in the solutions provided in the embodiments of this application, unless otherwise specified, a memory is usually a main memory of a computer system. The main memory is configured to temporarily store related data and a program instruction that are required when a processor runs a program. The main memory is usually a DRAM, or may be an SRAM or another memory that can provide a function same as or similar to that of a DRAM or an SRAM.

It should be understood that in the solutions provided in the embodiments of this application, a computing device is a device that can be abstracted as a computer system. A computing device that supports a wireless communication function may be referred to as a wireless communications device. The wireless communications apparatus may be a computing device, or may be a component of a computing device, for example, a chip related to a wireless communication function, for example, a system chip or a communications chip. The system chip is also referred to as a system on chip, or is referred to as a system on a chip (SoC) chip. Specifically, the wireless communications apparatus may be a terminal such as a smartphone, or may be a system chip or a communications chip that can be disposed in a terminal. In addition, the wireless communications apparatus may be a radio access network device such as a base station, or may be a related chip that can be disposed in a radio access network device, for example, an SoC chip or a communications chip. The communications chip may include a radio frequency processing chip and a baseband processing chip. The baseband processing chip is also referred to as a modem. In physical implementation, the communications chip may be integrated into an SoC chip, or may not be integrated into an SoC chip. For example, the baseband processing chip is integrated into the SoC chip, but the radio frequency processing chip is not integrated into the SoC chip.

According to a first aspect, a computer system is provided, including:

a main computing system, configured to run a main operating system; a functional subsystem, configured to run an auxiliary operating system; and a memory management apparatus, coupled to the main computing system and the functional subsystem, and configured to:

obtain a set of memory addresses corresponding to dynamic memory space allocated by the main operating system to the functional subsystem, where the set of memory addresses includes one or more memory addresses; and send some memory addresses in the set of memory addresses to a component of the functional subsystem.

According to a second aspect, a wireless communications apparatus is provided, including:

an application subsystem, configured to run a main operating system; a communications subsystem, configured to run a communications operating system; and a memory management hardware accelerator, coupled to the application subsystem and the communications subsystem and configured to:

obtain a set of memory addresses corresponding to dynamic memory space allocated by the main operating system to the communications subsystem, where the set of memory addresses includes one or more memory addresses; and send some memory addresses in the set of memory addresses to a component of the communications subsystem.

According to a third aspect, a wireless communications apparatus is provided, including:

a communications subsystem, configured to run a communications operating system; and a memory management hardware accelerator, coupled to an application subsystem and the communications subsystem, where the application subsystem is configured to run a main operating system; and the memory management hardware accelerator is configured to:

obtain a set of memory addresses corresponding to dynamic memory space allocated by the main operating system to the communications subsystem, where the set of memory addresses includes one or more memory addresses; and send some memory addresses in the set of memory addresses to a component of the communications subsystem.

According to a fourth aspect, a wireless communications apparatus is provided, including:

an application processor, configured to run a main operating system; a communication processor, configured to run a real-time operating system of a communications subsystem; and a memory management apparatus, electrically connected to the application processor and the communication processor, and configured to:

obtain a set of memory addresses corresponding to dynamic memory space allocated by the main operating system to the communications subsystem, where the set of memory addresses includes one or more memory addresses; and send some memory addresses in the set of memory addresses to a component of the communications subsystem.

According to a fifth aspect, a wireless communications apparatus is provided, including:

a communication processor, configured to run a real-time operating system of a communications subsystem; and a memory management apparatus, electrically connected to an application processor and the communication processor, where the application processor is configured to run a main operating system, and the memory management apparatus is configured to:

obtain a set of memory addresses corresponding to dynamic memory space allocated by the main operating system to the communications subsystem, where the set of memory addresses includes one or more memory addresses; and send some memory addresses in the set of memory addresses to a component of the communications subsystem.

According to a sixth aspect, a memory management method is provided. The method is performed by a memory management apparatus, the memory management apparatus is coupled to a main computing system and a functional subsystem, the main computing system is configured to run a main operating system, and the functional subsystem is configured to run an auxiliary operating system. The method includes:

obtaining a set of memory addresses corresponding to dynamic memory space allocated by the main operating system to the functional subsystem, where the set of memory addresses includes one or more memory addresses; and sending some memory addresses in the set of memory addresses to a component of the functional subsystem.

According to a seventh aspect, a memory management apparatus is provided. The memory management apparatus is coupled to a main computing system and a functional subsystem. The main computing system is configured to run a main operating system, and the functional subsystem is configured to run an auxiliary operating system. The memory management apparatus includes:

a first memory management module, configured to obtain a set of memory addresses corresponding to dynamic memory space allocated by the main operating system to the functional subsystem, where the set of memory addresses includes one or more memory addresses; and a second memory management module, configured to send some memory addresses in the set of memory addresses to a component of the functional subsystem.

According to an eighth aspect, a memory management hardware accelerator is provided. The memory management hardware accelerator is coupled to a main computing system and a functional subsystem. The main computing system is configured to run a main operating system, and the functional subsystem is configured to run an auxiliary operating system. The memory management hardware accelerator includes:

memory management accelerator hardware and a memory management accelerator driver, where the memory management accelerator driver includes a first driver that cooperates with the memory management accelerator hardware to work, a second driver that cooperates with the main computing system to work, and a third driver that cooperates with the functional subsystem to work. The memory management accelerator hardware and the memory management accelerator driver are cooperatively configured to:

obtain a set of memory addresses corresponding to dynamic memory space allocated by the main operating system to the functional subsystem, where the set of memory addresses includes one or more memory addresses; and send some memory addresses in the set of memory addresses to a component of the functional subsystem.

It should be understood that the main computing system may be a subsystem including an operation core or a control core of the computer system, for example, an application subsystem of a smartphone. A main operating system of the computer system is run in the subsystem. The main operating system may be a mobile platform operating system such as an Android operating system or an iPhone operating system, or may be another operating system such as a desktop computer, an Internet of things device, or a cloud server. Program code of the main operating system is mainly stored in a large-capacity storage. When the computer system is powered on and works, the program code of the main operating system may be first loaded to a memory, and then loaded to a processing core of the application subsystem, for example, a CPU. The main operating system may manage software and hardware resources of the entire computer system, for example, manage memory space fixedly allocated to the application subsystem.

It should be understood that the foregoing functional subsystem may be an independent subsystem such as a communications subsystem. Each functional subsystem may be responsible for some independent functions of the computer system. The functional subsystem may have an independent operating system, and may be denoted as an auxiliary operating system relative to the main operating system. The program code of the auxiliary operating system may also be stored in the large-capacity storage. When the functional subsystem is powered on and works, the program code of the auxiliary operating system may be first loaded to a memory, and then loaded to a processing core of the functional subsystem, for example, a CPU or a DSP. The auxiliary operating system may manage software and hardware resources of the functional subsystem, for example, manage memory space fixedly allocated to the functional subsystem.

It should be understood that, because a size of the dynamic memory space allocated by the main operating system to the functional subsystem (for example, the communications subsystem) is adjustable, a size of the set of memory addresses is also changeable. Change factors of the size of the set of memory addresses include a size of the dynamic memory space and a use status of a memory address in the set of memory addresses. For example, if the main operating system first allocates a part of memory space to the functional subsystem (for example, the communications subsystem), the memory management hardware accelerator may obtain memory addresses corresponding to the part of memory space. The memory addresses corresponding to the part of memory space form a set of memory addresses. When the memory addresses corresponding to the part of memory space are already used by the functional subsystem (for example, the communications subsystem), or the main operating system reclaims some memory addresses from the set of memory addresses, a quantity of memory addresses in the set of memory addresses is reduced. In this case, if the main operating system further allocates another part of memory space to the functional subsystem (for example, the communications subsystem), memory addresses corresponding to the newly allocated memory space may also be grouped into the set of memory addresses. Correspondingly, a quantity of memory addresses in the set of memory addresses increases.

The communications operating system running in the communications subsystem may be a real-time operating system, for example, a QuRT real-time operating system of Qualcomm. A component of the communications subsystem may be one or more of a processing core (CCore) of the communications subsystem, a hardware accelerator (HAC) of the communications subsystem, a baseband processor (BBP) of the communications subsystem, or another component of the communications subsystem that has a memory use requirement.

An application subsystem and a communications subsystem that are included in a wireless communications apparatus may be components of the application subsystem and the communications subsystem. For example, the wireless communications apparatus may include the processing core of the application subsystem, denoted as an application processor. The wireless communications apparatus may include the processing core of the communications subsystem, denoted as a communication processor.

Based on the technical solution provided in any one of the foregoing aspects, the memory management apparatus (for example, the memory management hardware accelerator) is configured to obtain the set of memory addresses corresponding to the dynamic memory space allocated by the main operating system to the functional subsystem (for example, the communications subsystem). Because the size of the dynamic memory space allocated by the main operating system is adjustable, this helps reduce a size of the memory space fixedly allocated to the functional subsystem. In addition, application data (such as a voice, a video, and a text) stored by a component of the functional subsystem in the dynamic memory space allocated by the main operating system can be accessed by the main computing system (such as the application subsystem) without an additional transferring or copy operation; therefore, a large quantity of unnecessary memory access overheads can be saved, thereby reducing system power consumption and a service delay. In addition, the memory management apparatus is configured to send some memory addresses in the set of memory addresses to the component of the communications subsystem. The component of the functional subsystem can use, at any time, the some memory addresses that have been sent to the component, and neither needs to apply to the auxiliary operating system (for example, the communications operating system), nor needs to apply to the main operating system. Therefore, the some memory addresses can be directly used by the component without applying to the auxiliary operating system, and this helps reduce a memory allocation delay.

In the technical solution provided in any one of the foregoing aspects, the memory management apparatus may be a general-purpose function processor that runs a computer program, or may be a memory management hardware accelerator. A driver of the memory management hardware accelerator is lower-layer software compared with software of an operating system (the main operating system and the auxiliary operating system), and a response delay of the lower-layer software is more controllable. Therefore, this helps further reduce the memory allocation delay.

With reference to the technical solution provided in any one of the foregoing aspects, in an optional implementation, the some memory addresses of the component sent to the functional subsystem (for example, the communications subsystem) may be stored in a first memory. Different components of the functional subsystem may correspond to different first memories. A first memory corresponding to each component may be a built-in memory of the component, for example, a tightly coupled memory or a register. The some memory addresses are stored in the built-in memory of the component. In this case, if the component has a memory use requirement, some memory addresses may be directly read from the built-in memory of the component, and memory space corresponding to these memory addresses is directly used. Therefore, compared with storing the memory addresses in another location, for example, in a memory, storing the some memory addresses in the built-in memory of the component can further reduce a memory allocation delay.

With reference to the technical solution provided in any one of the foregoing aspects or optional implementations, in an optional implementation, the memory management apparatus (for example, the memory management hardware accelerator) is configured to send, based on a category of the component of the functional subsystem (for example, the communications subsystem), some memory addresses in the set of memory addresses to the first memory. For example, a component of a first category requires a higher memory capacity, so as to send more memory addresses. In this case, the component may select a built-in memory with a larger capacity. A component of a second category requires a smaller memory capacity, so as to send fewer memory addresses. In this case, the component may select a built-in memory with a smaller capacity. For memory capacity requirements of components of different categories may be determined based on statistical data or historical experience. For example, a component of a 5G communications subsystem has a higher memory capacity requirement than a component of a 4G communications subsystem. A component with a complex data processing task has a higher memory requirement than a component with a simple data processing task.

With reference to the technical solution provided in any one of the foregoing aspects or optional implementations, in an optional implementation, the memory management apparatus (for example, the memory management hardware accelerator) is configured to periodically send some memory addresses in the set of memory addresses to the first memory. A cycle for sending the memory addresses to the first memory may also be determined with reference to a capacity of the first memory or a category of a component in which the first memory is located. For example, a larger capacity of the first memory may indicate a longer cycle for sending the memory address to the first memory. On the contrary, a smaller capacity of the first memory may indicate a shorter cycle for sending the memory address to the first memory. For another example, a sending cycle of a first memory corresponding to a component of a 5G communications subsystem may be shorter, and a sending cycle of a first memory corresponding to a component of a 4G communications subsystem may be longer.

With reference to the technical solution provided in any one of the foregoing aspects or optional implementations, in an optional implementation, the memory management apparatus (for example, the memory management hardware accelerator) is configured to send some memory addresses in the set of memory addresses to the first memory based on triggering of a first event.

The first event may be detected by the first memory or a component served by the first memory; and after the first event is detected, the memory management apparatus is notified that the first event has occurred. Alternatively, the first event may be that the memory management apparatus proactively detects, for example, a read/write status of the first memory.

Specifically, the first event may include that a quantity of memory addresses stored in the first memory is less than a first lower threshold. It should be understood that the quantity of memory addresses may be a natural number, or may be a relative proportion. Correspondingly, the first lower threshold may also be a natural number or a relative proportion. Alternatively, the first event may include a first hardware interrupt request from the component of the functional subsystem (for example, the communications subsystem). Certainly, the first event may also include a first software interrupt response from the component of the functional subsystem (for example, the communications subsystem). A processing delay of a hardware interrupt response is usually shorter than that of a software interrupt response.

With reference to the technical solution provided in any one of the foregoing aspects or optional implementations, in an optional implementation, the component of the functional subsystem (for example, the communications subsystem) further includes a second memory, and the second memory is configured to store a memory address that is received from the memory management apparatus (for example, the memory management hardware accelerator) and that has been used by the component of the functional subsystem (for example, the communications subsystem).

In specific implementation, the first memory and the second memory may be different memories, or may be different storage space in a same memory. In addition, different components of the functional subsystem may correspond to different second memories or different storage space of a same memory. In an optional alternative implementation, the second memory may also be placed in the memory management apparatus. In another optional alternative implementation, the memory address that is received from the memory management apparatus (for example, the memory management hardware accelerator) and that has been used by the component of the functional subsystem (for example, the communications subsystem) may still be stored in the first memory.

With reference to the technical solution provided in any one of the foregoing aspects or optional implementations, in an optional implementation, the memory management apparatus (for example, the memory management hardware accelerator) is further configured to receive, based on triggering of a second event, the memory address stored in the second memory.

The second event may be different from the first event. The second event may be detected by the second memory or a component served by the second memory; and after the second event is detected, the memory management apparatus is notified. Alternatively, the second event may be proactively detected by the memory management apparatus. For example, a read/write status of the second memory is detected.

Specifically, the second event may include that a quantity of memory addresses stored in the second memory is greater than a second upper threshold. The second lower threshold may be a natural number or a relative proportion. Alternatively, the second event may include a second hardware interrupt request from the component of the functional subsystem (for example, the communications subsystem).

It should be understood that the second hardware interrupt request may be different from the first hardware interrupt request, that is, the second hardware interrupt request and the first hardware interrupt request have different hardware interrupt numbers. Certainly, the second event may also include a second software interrupt response from the component of the functional subsystem (for example, the communications subsystem). There may alternatively be a plurality of second software interrupt requests, and each second software interrupt request has a corresponding software interrupt number.

With reference to the technical solution provided in any one of the foregoing aspects or optional implementations, in an optional implementation, the memory address in the set of memory addresses is stored in a third memory. The third memory may be a built-in memory of the memory management apparatus (for example, the memory management hardware accelerator). In another optional implementation, the third memory may be a memory connected to the memory management apparatus (for example, the memory management hardware accelerator) through an interconnect bus. The latter optional implementation can save an overhead of the built-in memory in the memory management apparatus, while the former optional implementation can further improve a capability of managing the memory addresses in the set of memory addresses by the memory management apparatus. In this way, a memory allocation rate can be increased.

On this basis, the memory management apparatus (for example, the memory management hardware accelerator) may be further configured to detect status information of the set of memory addresses. The status information of the set of memory addresses is used to indicate a quantity of memory addresses in the set of memory addresses. Correspondingly, the memory management apparatus (for example, the memory management hardware accelerator) may be further configured to: when it is detected that the quantity of memory addresses in the set of memory addresses is less than a third lower threshold, indicate the main operating system to supplement the set of memory addresses with some memory addresses In addition, the memory management apparatus (for example, the memory management hardware accelerator) may be further configured to: when it is detected that the quantity of memory addresses in the set of memory addresses is greater than a third upper threshold, indicate the main operating system to reclaim some memory addresses from the set of memory addresses.

With reference to the technical solution provided in any one of the foregoing aspects or optional implementations, in an optional implementation, the memory address received from the second memory based on triggering of the second event is stored in a fourth memory. The fourth memory may be a built-in memory of the memory management apparatus (for example, the memory management hardware accelerator) or a memory. Correspondingly, the memory management apparatus (for example, the memory management hardware accelerator) may be further configured to: when it is detected that a quantity of memory addresses in the fourth memory is greater than a fourth upper threshold, indicate the main operating system to reclaim the memory address from the fourth memory.

With reference to the technical solution provided in any one of the foregoing aspects or optional implementations, in an optional implementation, the memory management apparatus (for example, the memory management hardware accelerator) is configured to periodically obtain a memory address corresponding to dynamic memory space allocated by the main operating system to the functional subsystem (for example, the communications subsystem). The periodically obtained memory address is also grouped into the set of memory addresses.

A cycle for obtaining a memory address corresponding to the dynamic memory space allocated by the main operating system to the functional subsystem (for example, the communications subsystem) is greater than a cycle for sending some memory addresses in the set of memory addresses to the first memory.

With reference to the technical solution provided in any one of the foregoing aspects or optional implementations, in an optional implementation, memory addresses corresponding to the dynamic memory space allocated by the main operating system to the functional subsystem (for example, the communications subsystem) are stored in pointers of a plurality of different levels. Pointers of a same level correspond to memory space of a same size, and pointers of different levels correspond to memory space of different sizes.

With reference to the technical solution provided in any one of the foregoing aspects or optional implementations, in an optional implementation, a component of the memory management apparatus (for example, the memory management hardware accelerator) and the component of the functional subsystem (for example, the communications subsystem) are integrated into a same chip. In another optional implementation, a component of the memory management apparatus (for example, the memory management hardware accelerator) and a component of the main computing system (for example, an application subsystem) are integrated into a same chip. It should be understood that, the integration herein is a physical form in which the chip is present during manufacturing, packaging, and sales. The components may be hardware components, or some of the components may be hardware components and some of the components are software components. This is not limited.

With reference to the technical solution provided in any one of the foregoing aspects or optional implementations, in an optional implementation, the component of the functional subsystem (for example, the communications subsystem) includes one or more of a processing core of the functional subsystem (for example, the communications subsystem), a hardware accelerator of the functional subsystem (for example, the communications subsystem), or a sub function processor of the functional subsystem (for example, a baseband processor of the communications subsystem).

According to a ninth aspect, a computer-readable storage medium is provided. The computer-readable storage medium stores program code. When the program code is executed by a computer or a processor, the memory management method or apparatus in any one of the plurality of technical solutions provided in the sixth aspect, the seventh aspect, and the foregoing optional implementations is implemented. When the memory management apparatus is a memory management hardware accelerator, the program code stored in the computer-readable storage medium may be a driver or firmware of the memory management hardware accelerator.

According to a tenth aspect, a computer program product is provided. When program code included in the computer program product is executed by a computer or a processor, the memory management method or apparatus in any one of the plurality of technical solutions provided in the sixth aspect, the seventh aspect, and the foregoing optional implementations is implemented. When the memory management apparatus is a memory management hardware accelerator, the program code included in the computer program product may be a driver or firmware of the memory management hardware accelerator.

It should be understood that a plurality of types of memories are provided in the foregoing plurality of technical solutions, including the first memory, the second memory, the third memory, and the fourth memory. The first memory and the second memory may be understood as a specific component or specific components serving the functional subsystem, and are described in the following specific implementations by using a pointer subgroup as an example. The third memory and the fourth memory may be understood as components serving the entire functional subsystem, and are described in the following specific implementations with reference to an example of a pointer group.

It should be understood that because the main operating system is usually a non-real-time operating system, a software delay of the main operating system is comparatively large; however, a delay requirement of the functional subsystem is usually comparatively high. Therefore, a two-level memory management mechanism is mainly used in the foregoing plurality of technical solutions. A level-1 memory management mechanism is mainly for interaction between the memory management apparatus and the main operating system, and a second-level memory management mechanism is mainly for interaction between the memory management apparatus and the component of the functional subsystem. The two-level memory management mechanism helps decouple a memory allocation delay from a response delay of the main operating system. The memory allocation delay can be improved by optimizing the level-2 memory management mechanism. A frequency of interaction between the memory management apparatus and the component of the functional subsystem may be greater than, or even far greater than (for example, several orders of magnitude greater than) a frequency of interaction between the memory management apparatus and the main operating system. Correspondingly, a storage capacity of the first memory or the second memory may be less than, or even far less than (for example, several orders of magnitude less than) a storage capacity of the third memory or the fourth memory.

It should be understood that a plurality of thresholds associated with the quantity of memory addresses are further provided in the foregoing plurality of technical solutions, including: the first lower threshold, the second upper threshold, the third lower threshold, the third upper threshold, and the fourth upper threshold. It should be understood that these thresholds are not mutually exclusive and may be used in a combined manner. The quantity of memory addresses may be a natural number, or may be a relative proportion, for example, a percentage. Correspondingly, these thresholds may also be natural numbers or relative proportions. For any one of these thresholds, when the quantity of memory addresses is equal to the threshold, it may be considered that the quantity of memory addresses is in a critical state. For the critical state, it may be considered that a threshold determining condition is satisfied, and a corresponding subsequent operation is performed; or it may be considered that a threshold determining condition is not satisfied, and a corresponding subsequent operation is not performed. In addition, to avoid a ping-pong effect of a threshold determining operation, an additional condition, for example, a delay condition, may be further set for each type of threshold determining. Determining the first lower threshold is used as an example. It is considered that a threshold determining condition is satisfied, only when a quantity of memory addresses is less than the first lower threshold and this state lasts for a short delay time.

BRIEF DESCRIPTION OF THE DRAWINGS

FIG. 6 is a schematic diagram of memory allocation of a wireless communications device according to an embodiment of this application;

It should be understood that, in the foregoing schematic structural diagrams, sizes and forms of block diagrams are for reference only, and shall not constitute exclusive interpretations to the embodiments of the present application. A relative location and an inclusion relationship between the block diagrams shown in the schematic structural diagrams only schematically represent a structural association between the block diagrams, rather than limiting a physical connection mode in the embodiments of the present application.

DETAILED DESCRIPTION OF ILLUSTRATIVE EMBODIMENTS

The following further describes technical solutions provided in this application with reference to the accompanying drawings and embodiments. It should be understood that system architectures and service scenarios in the embodiments of this application are mainly intended to describe possible implementations of the technical solutions of this application, and shall not be construed as a unique limitation on the technical solutions of this application. A person of ordinary skill in the art may know that, with evolution of system architectures and emergence of new service scenarios, the technical solutions provided this application are also applied to similar technical problems.

It should be understood that a memory management method, apparatus, and system are included in a memory management solution provided in the embodiments of this application. Because problem-resolving principles of these technical solutions are the same or similar, in the following descriptions of specific embodiments, some repeated parts may not be described herein, but it should be considered that these specific embodiments are mutually referenced and may be combined with each other.

Figure 1:
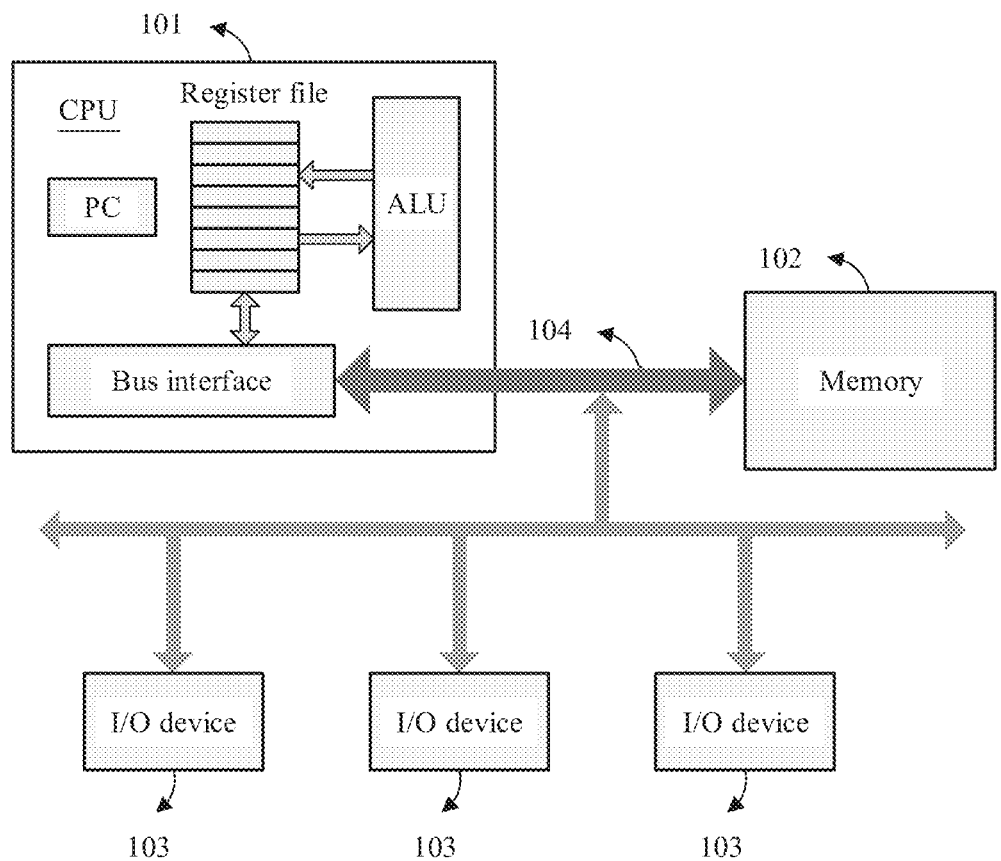
FIG. 1 is a schematic structural diagram of a computer system according to an embodiment of this application.

FIG. 1 is a schematic structural diagram of a computer system according to an embodiment of this application. As shown in FIG. 1, the computer system includes a central processing unit (CPU) 101, a memory (or storage) 102, an input/output (I/O) device 103, and an interconnect bus 104 that connects the CPU 101, the memory 102, and the I/O device 103. It should be understood that, for brevity, one CPU, one memory, and three I/O devices are shown in FIG. 1. However, in the computer system provided in this embodiment of this application, there may be one or more CPUs, one or more memories, and one or more I/O devices. In addition, the interconnect bus 104 may be a plurality of buses, or may even be a set of a plurality of types of buses.

The CPU is also referred to as a central processing unit, and is an engine that executes a program instruction. As the name implies, the CPU is a computing and controlling core component of the computer system. The memory is a storage component of the computer system, and is configured to store data and a program instruction. The bus is a data path that runs through each component inside the computer system, and is used to transfer data information between these components of the computer system. The I/O device is a data path between the computer system and an external input and output, and is configured to obtain input information from an external device or output information to an external device.

The bus is usually designed to transfer a fixed-length byte (byte or Byte) block, that is, a word. A quantity of bytes (a word length) in the word is a basic parameter of the computer system. A personal computer (PC) is used as an example. A word length of a frequently-used bus is 4 bytes (32 bits) or 8 bytes (64 bits). Common I/O devices include a keyboard, a mouse, a handle, a display, a microphone, a speaker, and the like. In particular, a disk or solid-state drive is also considered as an I/O device. In addition, a network communicating with the computer system may also be considered as an I/O device.

The CPU is usually a processor that supports a specific instruction set architecture (ISA). Common ISAs include a complex instruction set computing (CISC) architecture represented by x86, and a reduced instruction set computing (RISC) architecture represented by an ARM (Advanced RISC Machine or Acorn RISC Machine), an MIPS (Micro-processor without Interlocked Pipeline Stages), and Power. The CPU generally includes a register file, a program counter (PC), and an arithmetic logical unit (ALU).

The ALU is an execution unit of the CPU, and is mainly configured to implement basic arithmetic and logical operations such as addition, multiplication, negation, and shift. The register file includes some registers that have a very small capacity but have a very high access speed, and can be used to temporarily store a small quantity of instructions and addresses, and a small amount of data. The program counter is also referred to as an instruction pointer or an instruction address register, and is mainly configured to store an address of an instruction to be executed by the CPU. A register size and a quantity of registers are a part of an ISA specification. A common register size is 32 bits or 64 bits. In an example process, the CPU determines, based on the program counter, an address of an instruction to be executed, and the instruction and related data are loaded to the register file. Then, the CPU uses an arithmetic logic unit to complete an operation corresponding to the instruction, and may temporarily store an operation result in the register file. In addition, the CPU can further calculate an address of a next instruction and temporarily store the address in the program counter. Finally, the CPU continues to execute the next instruction, thereby implementing automatic running of a program.

The memory may be classified into a volatile memory and a non-volatile memory (NVM). The volatile memory is a memory in which data stored in the memory will be lost after a power supply is interrupted. Currently, volatile memories are mainly random access memories (RAM), and include a static random access memory (SRAM) and a dynamic random access memory (DRAM). The non-volatile memory is a memory in which data stored in the memory is not lost even if a power supply is interrupted. Common non-volatile memories include a read-only memory (ROM), an optical disc, a magnetic disk, a solid-state disk, various storage cards based on a flash memory technology, and the like.

Generally, an access rate and costs per unit capacity of a volatile memory are much higher than those of a non-volatile memory. To meet requirements of both a higher access rate and a larger storage capacity, the computer system usually uses a plurality of types of memories at the same time to form a hierarchical structure of memories. A basic idea of the hierarchical structure of the memories is that a memory with a higher access rate (an upper-level memory) is closer to the CPU, a memory with a larger storage capacity (a lower-level memory) is farther from the CPU, and the upper-level memory may usually be used as a cache of the lower-level memory.

Figure 2:
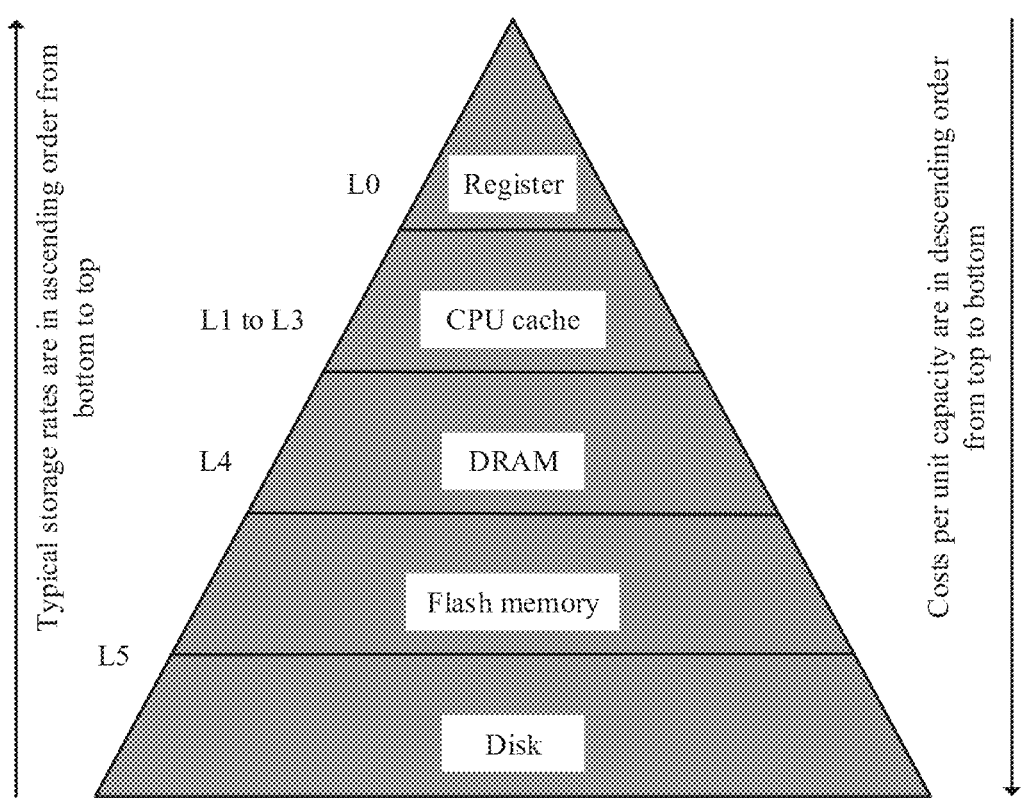
FIG. 2 is a schematic diagram of a hierarchical structure of memories of a computer system according to an embodiment of this application.

FIG. 2 is a schematic diagram of a hierarchical structure of memories of a computer system according to an embodiment of this application. As shown in FIG. 2, a register is located at the top, and is denoted as a level 0 or L0. A lower-level memory of the register is a CPU cache, and is also referred to as a cache. There may be a plurality of levels of CPU caches, for example, a level 1, a level 2, and/or a level 3. FIG. 2 shows three levels of CPU caches denoted as L1 to L3. The register and CPU cache generally each use an SRAM, but an access rate of the register is usually higher. A typical access rate of the SRAM is measured in several nanoseconds (ns). A lower-level memory of the CPU cache is a DRAM denoted as L4. A typical access rate of the DRAM is measured in tens of nanoseconds. A lower-level memory of the DRAM is a flash memory. A typical access rate of the flash memory is measured in tens of microseconds (μs). A lower-level memory level of the flash memory is a disk. A typical access rate of the disk is measured in several milliseconds (ms). The flash memory and the disk are usually used as local mass storage devices of the computer system, and are recorded as L5. In addition to the local mass storage devices, a remote mass storage device, for example, a cloud storage, may be further configured in a current computer system. It can be easily learned from FIG. 2 that, from top to bottom of the hierarchical structure of the memories of the computer system, typical access rates of the memories are in descending order, but costs per unit capacity are in descending order.

Figure 3:
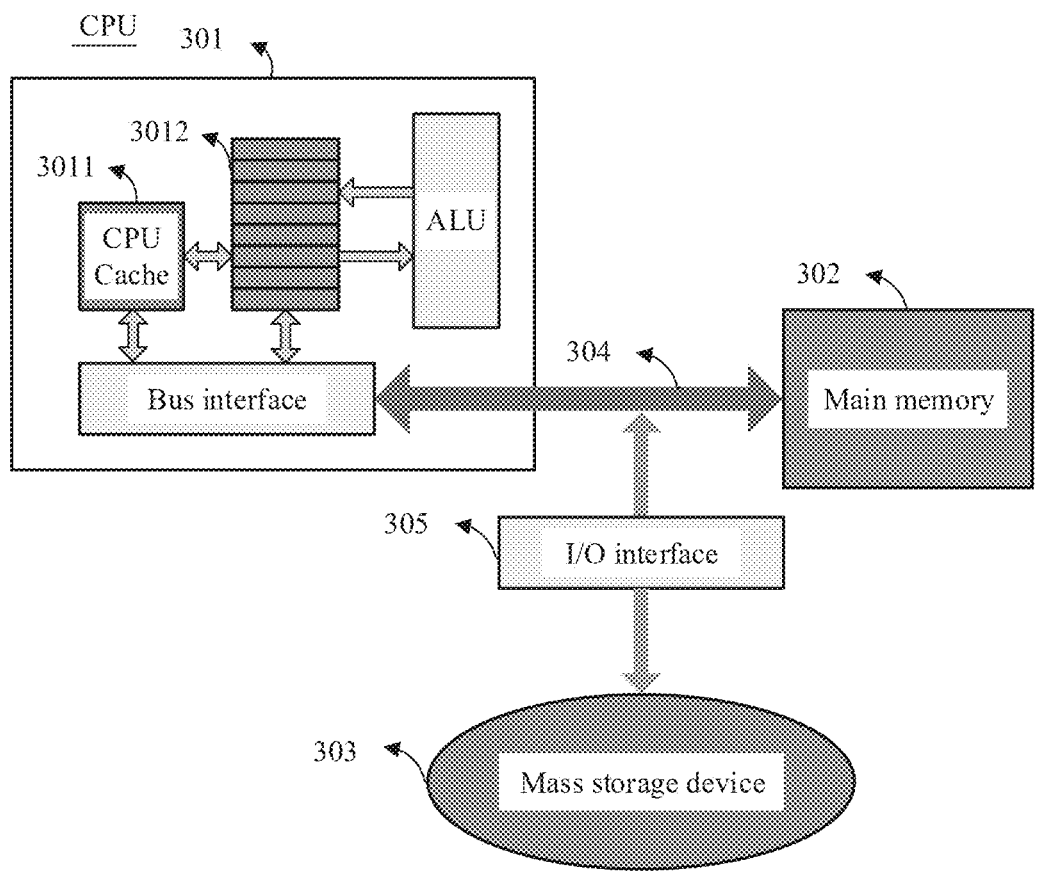
FIG. 3 is a schematic structural diagram of a storage subsystem of a computer system according to an embodiment of this application.

FIG. 3 is a schematic structural diagram of a storage subsystem of a computer system according to an embodiment of this application. As shown in FIG. 3, a CPU cache 3011 and a register file 3012 are integrated into a CPU 301, a main memory 302 is connected to the CPU 301 through an interconnect bus 304, and a mass storage device 303 used as an I/O device is connected to the CPU 301 through an I/O interface 305 and an interconnect bus 304.

A main memory (or primary storage) is MM for short. The main memory is a primary memory in the computer system as the name implies, and is configured to temporarily store related data and program instructions that are required when the CPU runs a program. The main memory is usually a DRAM, and sometimes includes an SRAM such as a register or a CPU cache. The mass storage device, also referred to as an auxiliary storage (secondary storage or auxiliary storage), generally uses a flash memory or a magnetic disk. An operating system and application software can be stored in the mass storage device for a long time. However, because an access rate of the mass storage device differs greatly from a clock cycle of the CPU, it is not suitable for direct access by the CPU. Therefore, when an operating system or an application needs to be run, related data and program instructions need to be copied from the mass storage device to the main memory, and the main memory temporarily stores the data and the instructions that are required for running the CPU, to meet a requirement for fast access by the CPU.

It is clearly that performance of the main memory determines performance of the computer system to a large extent. Therefore, the main memory is an internal component indispensable to the computer system, and is also referred to as a built-in memory (internal memory or memory). Correspondingly, the mass storage device is also referred to as an external memory, and may be disposed outside the computer system. However, because a demand for mass storage is still increasing, currently, a mass storage device is a very important component of a computer system, and is usually disposed inside the computer system.

While a read rate is considered, a total memory capacity of a main memory is always expected to be larger, so as to meet a memory space requirement of an entire wireless communications device. However, currently, limited by costs, the total memory capacity of the main memory is considerably less than storage space of the mass storage device. A smartphone is used as an example. A total memory of the smartphone usually ranges from hundreds of megabytes (MB) to several gigabytes (GB), for example, 512 MB, 1 GB, 2 GB, 3 GB, 4 GB, 6 GB, 8 GB or even higher. Storage space of a mass storage device usually ranges from dozens of GB to hundreds of GB, for example, 32 GB, 64 GB, 128 GB, 256 GB, 512 GB, or even higher.

It should be understood that, in this embodiment of this application, unless otherwise specified, the memory is usually the main memory of the computer system. Specifically, the memory may be a synchronous DRAM (SDRAM) with a double data rate (DDR), referred to as a DDR memory or a DDR for short. A common SDRAM transfers data only once in a clock cycle, while the DDR SDRAM can transfer data at least twice in the clock cycle; therefore, the data transfer rate is referred to as a double data rate. DDR memories include DDR 1, DDR 2, DDR 3, and DDR 4 that are formulated by the Joint Electron Device Engineering Council (JEDEC), and DDR memories based on subsequently evolved standards thereof, and also include a DDR memory referred to as a mobile DDR (MDDR) or a low power DDR (LPDDR, or LP-DDR).

Figure 4:
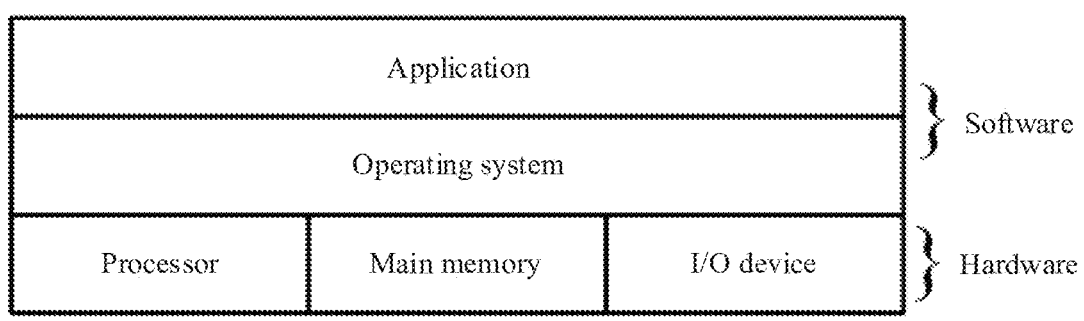
FIG. 4 is a schematic diagram of a layered structure of a computer system according to an embodiment of this application.

FIG. 4 is a schematic diagram of a layered structure of a computer system according to an embodiment of this application. As shown in FIG. 4, in the hierarchical structure of the computer system, hardware is located at a bottom layer, and software is located at a higher layer. An operating system is system software that manages hardware and software resources of a computing device, and may be considered as system software between an application and hardware. The operating system can usually provide basic functions such as memory management, I/O device management, and a user operation interface. Any attempt made by an application to perform an operation on hardware needs to made by using the operating system. Introduction of intermediate software, that is, the operating system, can provide a simple and consistent mechanism for applications to use complex and diversified underlying hardware, and can also prevent the underlying hardware from being abused by some out-of-control applications.

In addition, as functions supported by the computer system become more abundant, some important functions are usually implemented by relatively independent subsystems. These subsystems may have respective operating systems. In this case, a computer system may include a plurality of operating systems. A main operating system is run in a main system of the computer system to manage software and hardware resources of the computer system. In addition, an auxiliary operating system may be run in a subsystem to manage software and hardware resources of the subsystem.

A mobile phone is used as an example. Currently, a main operating system of a mobile phone platform is usually an Android operating system or an iPhone operating system. The main operating system may manage software and hardware resources of the entire mobile phone, and provide a graphic operation interface for a user. In addition, to support an ever-evolving radio access technology (RAT), there is usually a well-designed communications subsystem inside the mobile phone. An operating system different from the main operating system may be run in the communications subsystem. The operating system run in the communications subsystem is denoted as a communications operating system in this embodiment of this application. The communications operating system is usually a real-time operating system (RTOS). However, operating systems of mobile phone platforms such as an Android operating system and an iPhone operating system are not considered as real-time operating systems. According to the operating system theory, the "real-time" usually means that a time spent on a specific operation, for example, a memory allocation operation, does not exceed an upper time limit promised by the operating system. Therefore, using the real-time operating system by the communications subsystem helps better meet a low-delay requirement of some wireless communications services.

In a process of running both the application and the subsystem of the computer system, a part of memory space needs to be used. When the application or the subsystem of the computer system is being run, the operating system usually allocates a part of memory space to the application or the subsystem. For the operating system, memory management may be classified into dynamic memory management and static memory management. In a solution of dynamic memory management, this part of memory space allocated by the operating system to the application or the subsystem may be referred to as dynamic memory space or a dynamic memory. When not used by the application or the subsystem, the dynamic memory space may be reallocated by the operating system for use by another application or subsystem. In a solution of static memory management, this part of memory space allocated by the operating system to the application or the subsystem may be referred to as static memory space or a static memory. Even if the static memory space is not used by the application or the subsystem, the static memory space cannot be used by another subsystem or application, either.

With continuous evolution of computer systems, there are more subsystems for the computer systems, and these subsystems impose increasingly high memory requirements. The following uses a communications subsystem of a wireless communications device as an example to describe in detail some memory management solutions provided in this embodiment of this application. These memory management schemes help better meet the memory requirements of the subsystems of the computer system. For example, memory management solutions provided in some optional embodiments of this application can reduce a memory allocation delay, and help meet a memory requirement of a subsystem having a particularly strict delay requirement. More available memory can be provided in memory management solutions provided in other optional embodiments of this application, thereby helping reduce memory costs or improve memory use efficiency. It should be understood that the communications subsystem is merely an example of a subsystem of a computer, and the solutions provided in this embodiment of this application is also applicable to another subsystem of the computer.

Figure 5:
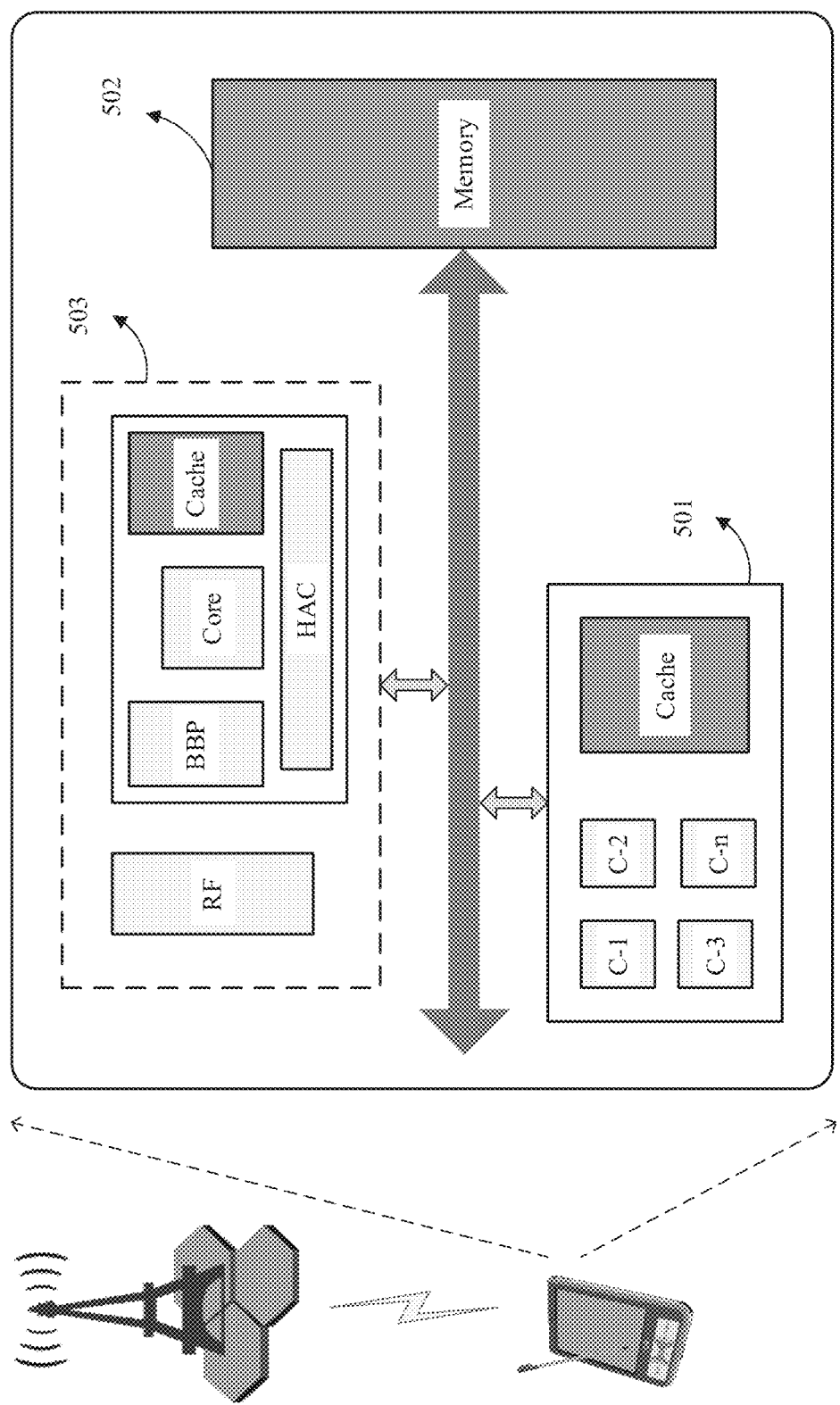
FIG. 5 is a schematic structural diagram of a wireless communications device according to an embodiment of this application.

FIG. 5 is a schematic structural diagram of a wireless communications device according to an embodiment of this application.

It should be understood that, in this embodiment of this application, the wireless communications device is a computing device having a wireless communication function. The wireless communications device may be a terminal in a wireless communications system, or may be a radio access network device such as a base station. A terminal and a base station that are shown in FIG. 5 may be used as an example of a mobile communications system based on a 3rd generation partnership project (3GPP) technical specification, or may cover a wireless communications system based on other wireless communications standards, for example, an 802 series of the Institute of Electrical and Electronics Engineers (IEEE) such as wireless communication standards 802.11, 802.15, and 802.20.

The terminal may also be referred to as user equipment (UE), a mobile station (MS), or a subscriber unit (SU). The terminal may be but is not limited to a mobile phone, a tablet computer, a laptop computer, a wearable device (for example, a smartwatch, a smart band, a smart helmet, or smart glasses), or another communications device having a wireless access capability, such as any Internet of things device, including a smart home device (for example, a smart meter or a smart appliance), a smart vehicle, or the like. The base station may be specifically a next generation node B (gNB) in a 5th generation (5G) mobile communications system, an evolved node B (eNB or eNodeB) in a 4th generation (4G) mobile communications system, or a base station in another possible radio access technology. There may also be a plurality of physical forms and transmit powers of the base station, for example, a macro base station or a micro base station.

As shown in FIG. 5, the wireless communications device includes an application subsystem 501, a memory 502, and a communications subsystem 503. The application subsystem 501 and the communications subsystem 503 are connected to the memory 502 through an interconnect bus, and both the application subsystem 501 and the communications subsystem 503 can use memory space provided by the memory 502. The application subsystem 501 may be used as a main control system or a main computing system of the wireless communications device; and is configured to: run a main operating system and an application, manage software and hardware resources of the entire wireless communications device, and provide a user operation interface for a user. The communications subsystem 503 is configured to: run a communications operating system and communication function software, manage software and hardware resources of the communications subsystem, and provide a wireless communication function for a user.

The application subsystem 501 may include one or more processing cores. FIG. 5 shows a multi-core application subsystem, including a core 1 (C-1), a core 2 (C-2), a core 3 (C-3), and a core n (C-n), where n is a positive integer. Herein, n is merely an example. A value of n may be less than 4, for example, 2 or 1; or may be greater than or equal to 4, for example, 4, 8, 10, or 12. Capabilities of different cores may be different, for example, dominant frequencies are different. Each core may include a corresponding dedicated cache, and there may be a shared cache between a plurality of cores. In addition, the application subsystem 501 may include drive software related to another subsystem.

The communications subsystem 503 may be further divided into a radio frequency (RF) subsystem and a baseband (BB) subsystem. The radio frequency subsystem is mainly configured to process a radio frequency signal, and is represented by an RF module in FIG. 5. Specifically, the radio frequency subsystem may include electronic devices such as an antenna, a switch, a low noise amplifier, a power amplifier, a mixer, an oscillator, a filter, and a processor, to provide a receive path and a transmit path. The receive path is configured to: receive a radio frequency signal through an antenna, perform processing (for example, amplification, filtering, and down-conversion) on the radio frequency signal to obtain an intermediate frequency signal or a baseband signal, and transfer the intermediate frequency signal or the baseband signal to the baseband subsystem. The receive path is configured to: receive an intermediate frequency signal or a baseband signal from the baseband subsystem, perform processing (for example, up-conversion, amplification, and filtering) on the intermediate frequency signal or the baseband signal to obtain a radio frequency signal, and finally radiate the radio frequency signal into space through the antenna.

The baseband subsystem may include one or more processing cores, an analog-to-digital conversion component, a baseband processor (BBP), a hardware accelerator (HAC), a cache, and the like. For illustrative purposes, a baseband processor, a processing core, a hardware accelerator, and a cache are shown in FIG. 5. It should be understood that a type and a quantity of these electronic components are not limited in this embodiment of this application. The baseband subsystem may not include some components (for example, an HAC) shown in FIG. 5, or may include some components (for example, an analog-to-digital conversion component) that are not shown in FIG. 5. The analog-to-digital conversion component includes an analog-to-digital converter (ADC) that converts an analog signal into a digital character, and a digital-to-analog converter (DAC) that converts a digital signal into an analog signal.

The baseband processor may be configured to extract useful information or data bits from a digital signal originating from a base station, or convert information or data bits originating from an application subsystem into a digital signal to be sent to a base station. The information or data bits may be data that represents user data or control information such as a voice, a text, or a video. Specifically, the baseband processor may implement baseband signal processing operations such as modulation, demodulation, encoding, and decoding. In addition, different radio access technologies, for example, 5G new radio (NR) and 4G long term evolution (LTE), baseband signal processing operations that are not exactly the same may be performed. Therefore, to support merging of a plurality of mobile communication modes, a plurality of processing cores and even a plurality of baseband processors may be included at the same time.

The hardware accelerator may be configured to implement some sub-functions with comparatively high processing overheads, for example, assembly, parsing, encryption, and decryption of a data packet. These sub-functions may also be implemented by using a processor having a common function. However, for consideration of performance or costs, it may be more proper to use the hardware accelerator to implement these sub-functions. Therefore, a type and a quantity of hardware accelerators may be specifically selected based on a requirement. In a specific implementation, one or a combination of a field programmable gate array (FPGA) and an application-specific integrated circuit (ASIC) may be used for implementation. Certainly, one or more processing cores may also be used in the hardware accelerator.

It should be understood that, in this embodiment of this application, each processing core of the wireless communications device may represent one processor, and the processor may be a general-purpose processor, or may be a processor designed for a specific field. For example, the processor may be a CPU, or may be a digital signal processor (DSP). When required, the processor may be a micro control unit (MCU), a graphics processing unit (GPU), an image signal processor (ISP), an audio signal processor (ASP), or any processor that is applied to an artificial intelligence (AI) application and that includes but is not limited to a neural network processing unit (NPU), a tensor processing unit (TPU), or a processor referred to as an AI engine.

In an actual application, based on a requirement of an application scenario, the wireless communications device may use a combination of different quantities of processing cores and different types of processing cores. In addition, function division of the radio frequency subsystem and the baseband subsystem in the communications subsystem 503 may also be adjusted. For example, some functions of the radio frequency subsystem are integrated into the baseband subsystem, or some functions of the baseband subsystem are integrated into the radio frequency subsystem.

In an implementation, the radio frequency subsystem may include an independent antenna, an independent radio frequency (RF) front end (RFFE) device, and an independent radio frequency processing chip. The radio frequency processing chip is sometimes referred to as a receiver, a transmitter, or a transceiver. All of the antenna, radio frequency front-end device, and radio frequency processing chip can be manufactured and sold separately. Certainly, the radio frequency subsystem may also use different components or different integration manners based on requirements on power consumption and performance. For example, some components belonging to the radio frequency front-end device are integrated into the radio frequency processing chip.

In an implementation, the baseband subsystem may be used as an independent chip, and the chip may be referred to as a modem. Hardware components of the baseband subsystem may be manufactured and sold by modem. Because the baseband processor is a core device for wireless communication, the modem is also sometimes referred to as a baseband chip or a baseband processor. In another implementation, the baseband subsystem may be further integrated into an SoC chip, and is manufactured and sold by SoC chip. In addition, software components of the baseband subsystem may be built in hardware components before delivery, or may be imported from other nonvolatile memories into the hardware components after delivery, or these software components may be updated and upgraded on line through a network.

In a process of running the communications subsystem, a large quantity of data processing operations may be performed. Consequently, specific memory space is occupied. In addition, a wireless communications service has a comparatively high requirement on a low delay. Therefore, if the main operating system of the wireless communications device dynamically allocates a memory to the communications subsystem, a memory allocation delay may be comparatively long; consequently, a requirement of some wireless communications services on a low delay cannot be met. Therefore, to meet a requirement of a wireless communications service on a low delay, a part of memory space may be fixedly allocated to the communications subsystem, and is directly managed by the communications operating system.

FIG. 6 is a schematic diagram of memory allocation of a wireless communications device according to an embodiment of this application.

As shown in the left part of FIG. 6, a total memory capacity of the wireless communications device is fixedly divided into three parts denoted as "Other", "Application subsystem", and "Communications subsystem" from top to bottom. The "Other" indicates that this part of memory space is used for other purposes, for example, reserved for other subsystems. The "Application subsystem" indicates that this part of memory space is allocated to the application subsystem for use, and is denoted as A1. Largest memory space is usually allocated to the application subsystem. This part of memory space is directly managed by a main operating system that is run in the application subsystem, and is allocated, on demand, to an application that is run in the wireless communications device and some subsystems for use. It should be understood that memory division shown in FIG. 6 is merely an example. A memory of the wireless communications device may be divided in another manner, for example, the memory is divided into two parts, four parts, or more parts.

The "Communications subsystem" indicates that this part of memory space is allocated to the communications subsystem for use, and is denoted as C1. This part of memory space allocated to the communications subsystem is usually directly managed by the communications operating system, and is usually invisible to the main operating system. In other words, even if the communications subsystem does not use all of the allocated memory space, the memory space cannot be allocated by the main operating system to another subsystem or application for use. Therefore, in this sense, this part of memory space fixedly allocated to the communications subsystem is also equivalent to static memory space for the main operating system.

In addition, to ensure performance of a wireless communications service, a size of the memory space allocated to the communications subsystem is usually determined with reference to a peak rate used in wireless communication. However, in a working cycle of the wireless communications device, a time proportion of a peak rate used in wireless communications is usually comparatively small. In this case, actual usage of the memory space allocated to the communications subsystem may not be high, and this may cause a waste of memory space in a statistical sense.

A phenomenon of wasting memory space in a statistical sense is shown on the right part of FIG. 6. A solid line represents a memory capacity allocated to the communications subsystem and is denoted as C1. A dashed line represents a memory capacity actually used by the communications subsystem, and is denoted as C2. It can be learned from FIG. 6 that, between moments t1 and t2, the memory capacity C2 actually used by the communications subsystem is always less than the memory capacity C1 fixedly allocated to the communications subsystem, and a difference between C1 and C2 represents a memory capacity that is not fully used. In addition, in a statistical sense, a waste degree of the memory space is directly proportional to a size of the memory space fixedly allocated to the communications subsystem.

A mobile phone is used as an example. A peak mobile data rate of a 4G network may reach 1.2 gigabits per second (Gbps). At least 150 MB memory space is required to store the mobile data. For a mobile phone that supports a 4G network, it may not be a big problem to fixedly allocate 150 MB memory space to the 4G communications subsystem. However, a peak mobile data rate of a 5G network may reach 10 Gbps, and at least 1.25 GB memory space is required to store so much mobile data. In this case, if 1.25 GB memory space is fixedly allocated to the 5G communications subsystem, a requirement on a memory capacity of the mobile phone is significantly increased, and consequently, memory costs are increased.

In addition, when the communications subsystem receives a large amount of application data (such as a voice, a video, and a text), the communications subsystem needs to transfer the application data to the application subsystem. From a perspective of a memory, the application data temporarily stored in this part of memory space corresponding to the communications subsystem needs to be transferred or copied to the part of memory space corresponding to the application subsystem. These transferring or copy operations cause a large quantity of memory access overheads, increase system power consumption, and increase a service delay. In some cases, when an amount of application data that needs to be transmitted is excessively large, a large quantity of memory access overheads may exceed a maximum memory access bandwidth, causing a failure of a wireless communications service.

Figure 7:
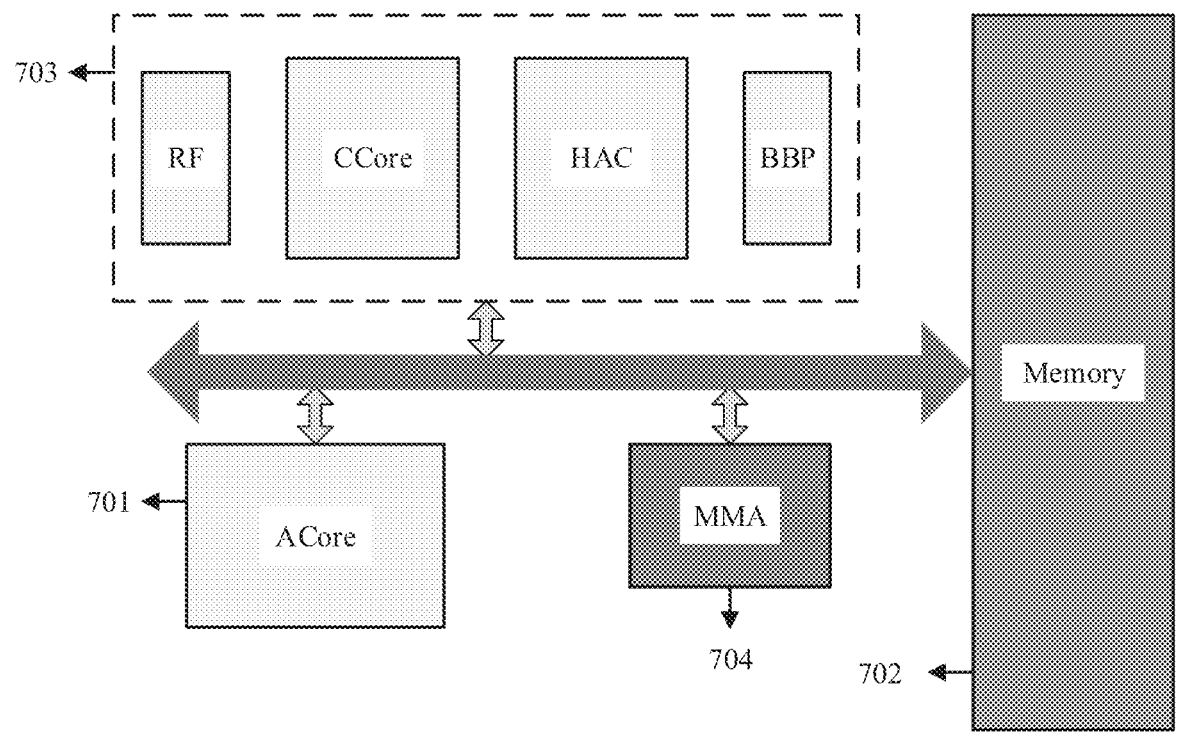
FIG. 7 is a schematic structural diagram of another wireless communications device according to an embodiment of this application.

FIG. 7 is a schematic structural diagram of another wireless communications device according to an embodiment of this application. Based on the wireless communications device shown in FIG. 5, a memory management accelerator (MMA) is shown on the wireless communications device. The memory management accelerator is configured to provide a memory management operation for a communications subsystem, and may partially replace a memory management function of an operating system (a communications operating system or a main operating system).

As shown in FIG. 7, the wireless communications device includes an application subsystem 701, a memory 702, a communications subsystem 703, and a memory management accelerator 704 that are connected through an interconnect bus. The application subsystem 701 may be configured to: run the main operating system, manage software and hardware resources of the wireless communications device, and in particular, manage memory space of the application subsystem. The communications subsystem may run a communications operating system and communication function software, manage software and hardware resources of the communications subsystem, and in particular, manage memory space of the communications subsystem. In FIG. 7, a processing core of the application subsystem 701 is denoted as an ACore, and a processing core of the communications subsystem 703 is denoted as a CCore. It should be understood that the application subsystem 701, the memory 702, and the communications subsystem 703 (including an RF module, an HAC, and a BBP) in FIG. 7 correspond to the application subsystem 501, the memory 502, and the communications subsystem 503 shown in FIG. 5, respectively. For related details, refer to the foregoing descriptions. Repeated content is not described again.

In this embodiment of this application, the memory management accelerator is a hardware accelerator, and the hardware accelerator includes a hardware component, but may also include a software component. The hardware component and the software component may jointly form a memory management accelerator subsystem that is referred to as a memory management accelerator or is an MMA subsystem for short. The hardware component of the memory management accelerator includes a processing component used for computing, for example, one or more of an ASIC, an FPGA, or a processing core. The hardware component of the memory management accelerator may further include a memory, for example, a register, a cache, or a tightly coupled memory (TCM). The software component of the memory management accelerator may be configured to adapt to a hardware component of the memory management accelerator, and collaborate with the hardware component to jointly provide a memory management operation for the communications subsystem.

Therefore, in this embodiment of this application, the memory management accelerator may be an independent hardware component, or may be a combination of a hardware component and a software component. In addition, the hardware component of the memory management accelerator may be a newly added hardware component in the wireless communications device, without increasing processing pressure of an original component in the wireless communications device. Alternatively, an original hardware component of the wireless communications device may be reused as the hardware component of the memory management accelerator, and the software component is upgraded to implement a function of the memory management accelerator provided in this embodiment of this application. The memory management accelerator may be an independent IC chip, or may be integrated into a communications chip or an SoC chip.

The memory management accelerator may also have another name, for example, a memory management hardware accelerator (MMHA or MMHAC), a memory accelerator (MA), a memory hardware accelerator (MHA or MHAC), a memory acceleration engine (MAE), a memory allocation accelerator (MAA), a memory allocation hardware accelerator (MAHA or MAHAC), a memory access accelerator (MAA), a memory access hardware accelerator (MAHA or MAHAC), or the like.

It should be understood that the memory management accelerator may also be applied to another computer system, to provide a memory management operation for another subsystem in the computer system, so as to obtain a same or similar technical effect. The following further describes the memory management solution provided in this embodiment of this application by using an example in which the memory management accelerator is configured to perform a memory management operation on the communications subsystem.

Based on the MMA subsystem 704 shown in FIG. 7, this embodiment of this application further provides two memory management mechanisms. The first memory management mechanism mainly relates to interaction between the MMA subsystem and the application subsystem, and may be used to allocate a part of memory space, which may be denoted as S1, to the communications subsystem from the memory space managed by the application subsystem. The second memory management mechanism mainly relates to interaction between the MMA subsystem and the communications subsystem, and may be used to allocate a part of memory space, which may be denoted as S2, to some components (for example, a CCore) of the communications subsystem from the memory space S1. The following further describes the two memory management mechanisms provided in this embodiment of this application with reference to the accompanying drawings.

Figure 8:
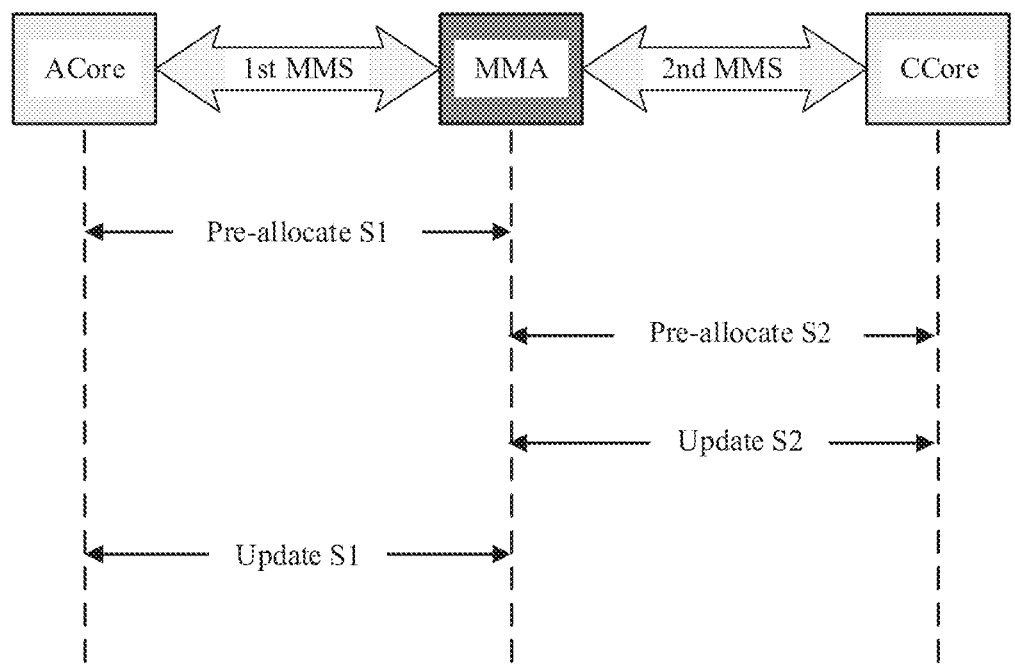
FIG. 8 is a schematic diagram of a framework of interaction in a memory management solution according to an embodiment of this application.

FIG. 8 is a schematic diagram of a framework of interaction in a memory management solution according to an embodiment of this application. In FIG. 8, an ACore represents an application subsystem in which a main operating system is run, an MMA represents an MMA subsystem, and a CCore represents a component of a communications subsystem. Interaction between the ACore and the MMA is denoted as a 1st MMS, that is, the first memory management mechanism. The interaction between the MMA and the CCore is denoted as a 2nd MMS, that is, the second memory management mechanism.

In the first memory management mechanism, the MMA subsystem may first interact with the application subsystem to obtain the memory space S1 allocated by the main operating system to the communications subsystem. This process may be denoted as "Pre-allocate S1". A size of the memory space S1 allocated by the main operating system to the communications subsystem may be dynamically adjusted, and there is no need to fixedly divide or statically reserve a comparatively large amount of memory space with reference to a peak rate of wireless communication. To ensure a proper size of the available memory space of the communications subsystem, the MMA subsystem may monitor a status of available memory in the memory space S1, interact with the application subsystem, and adjust the size of the memory space S1 accordingly. This process may be denoted as "Update S1". For example, when a wireless communication data rate is comparatively high, the MMA subsystem may find that available memory in the memory space S1 is insufficient, and may send an application to the main operating system, so that the main operating system allocates more memory, to increase a size of the memory space S1. In addition, when a wireless communication data rate is comparatively low, the MMA subsystem may find that available memory in the memory space S1 is excessively large, and may notify the main operating system that the available memory in the memory space S1 is excessively large, so that the main operating system reclaims spare memory, to reduce a size of the memory space S1.

Therefore, in the first memory management mechanism, the MMA subsystem can dynamically adjust a size of memory space allocated by the main operating system to the communications subsystem, thereby avoiding a waste of memory space. In addition, because the memory space is dynamically allocated by the main operating system, application data (such as a voice, a video, and a text) stored by the communications subsystem in the memory space can be accessed by the application subsystem without an additional transferring or copy operation. Therefore, a large quantity of unnecessary memory access overheads can be saved, and system power consumption and a service delay are further reduced.

In the second memory management mechanism, the MMA subsystem may interact with the communications subsystem, to allocate required memory space to the communications subsystem in real time. The "real time" herein may be understood as that a memory allocation delay can meet an actual requirement of a service. To ensure that a memory requirement of the communications subsystem can be met in a timely manner, in an optional implementation, a memory management accelerator may pre-allocate, from the memory space S1, a part of memory space S2 to some components (for example, a CCore) of the communications subsystem. This process may be denoted as "Pre-allocate S2". A capacity of the part of memory space S2 does not exceed a capacity of the memory space S1. The part of memory space S2 is pre-allocated by the MMA subsystem to the some components of the communications subsystem for use by these components. In another optional implementation, a memory management accelerator may provide a hardware access mechanism for some components (for example, a BBP) of the communications subsystem, so that these components can directly obtain, by accessing MMA hardware, a memory corresponding to S1. Therefore, when these components in the communications subsystem need to use a memory, these components may preferentially use the part of memory space S2 or obtain, by accessing MMA hardware, the memory corresponding to S1, without applying to the communications operating system again. In this way, a memory allocation speed of the communications subsystem can be increased.

In addition, to ensure that available memory is sufficient in the memory space S2 pre-allocated to the communications subsystem, the MMA subsystem may monitor a status of the available memory in the memory space S2, and interact with a component of the communications subsystem, to supplement the available memory of the memory space S2 in a timely manner. This process may be denoted as "Update S2". For example, when the memory management accelerator finds that the available memory in the memory space S2 is insufficient, the memory management accelerator may supplement the communications subsystem with some available memory from the memory space S1, to increase the available memory in the memory space S2. In addition, when the memory management accelerator finds that the available memory in the memory space S2 is sufficient, the memory management accelerator may alternatively defer supplementing the communications subsystem with the available memory.

For a specific component of the communications subsystem, even if smaller memory space S2 is pre-allocated to the component, a memory use requirement of the component can be met provided that it is ensured that a frequency of updating S2 is high enough and there is always available memory in the memory space S2. For example, if a peak memory access bandwidth of a specific component of the communications subsystem is 10 GB per second, and a capacity of the memory space S2 pre-allocated to the component is 1 MB, the peak memory access bandwidth rate of 10 GB per second of the component can be met provided that it is ensured that S2 is updated more than 10 times per millisecond.

Figure 9:
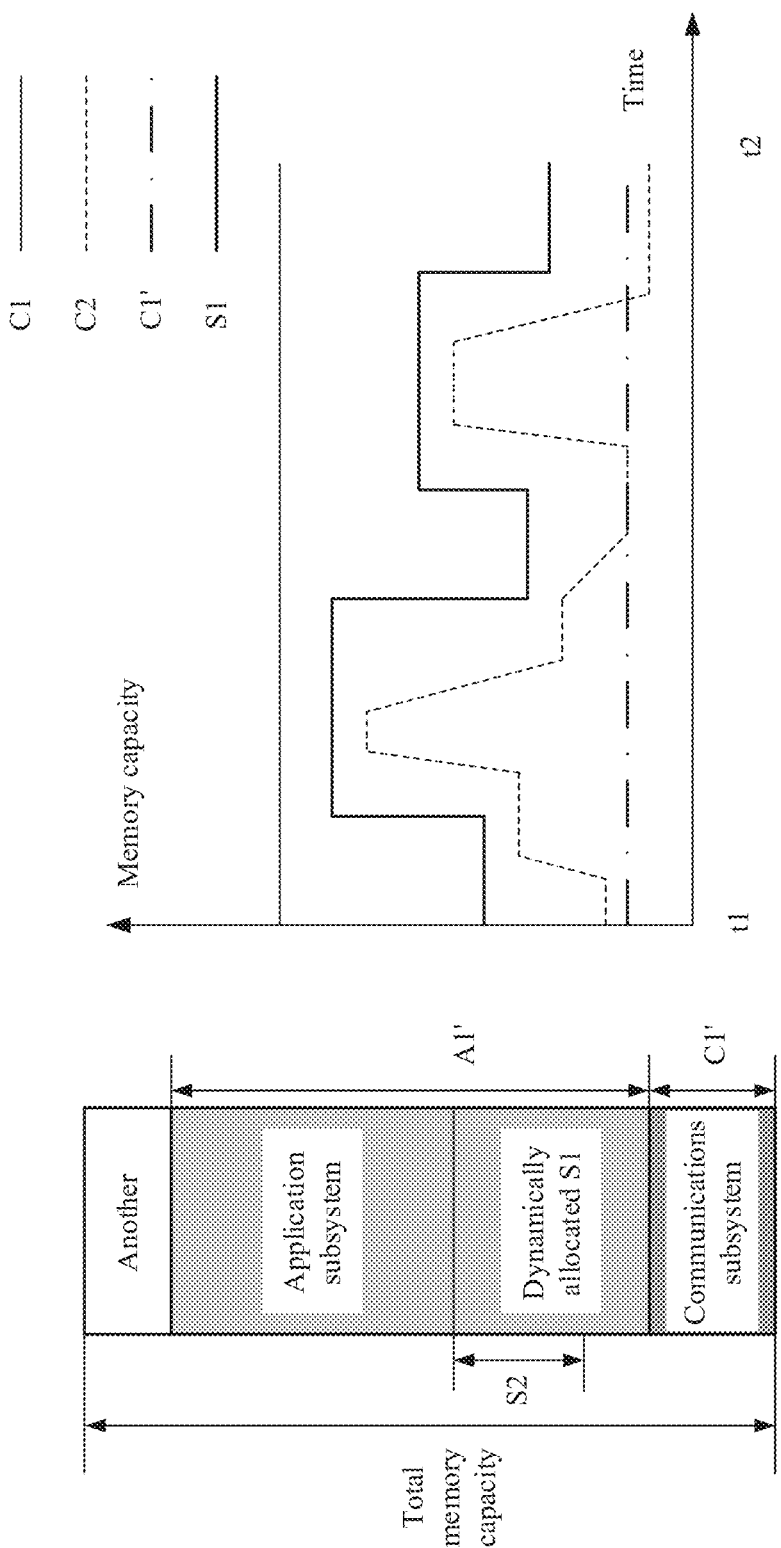
FIG. 9 is another schematic diagram of memory allocation of a wireless communications device according to an embodiment of this application.

FIG. 9 is another schematic diagram of memory allocation of a wireless communications device according to an embodiment of this application. The wireless communications device may be the wireless communications device shown in FIG. 7. The schematic diagram of memory division may be used to indicate memory allocation statuses present when the wireless communications device uses the foregoing two memory management mechanisms.

Similar to FIG. 6, on the left of FIG. 9, a total memory capacity of the wireless communications device is also fixedly divided into three parts: denoted as "Other", "Application subsystem", and "Communications subsystem" from top to bottom. The "Other" indicates that this part of memory space is used for other purposes, for example, reserved for other subsystems. The "Application subsystem" also indicates that this part of memory space is fixedly allocated to the application subsystem for use, and is denoted as A1'. The "Communications subsystem" also indicates that this part of memory space is fixedly allocated to the communications subsystem for use, and is denoted as C1'.

It can be learned, through a comparison between FIG. 6 and FIG. 9 that a size of the memory space C1' allocated to the "communications subsystem" in FIG. 9 is different from a size of the memory space C1 allocated to the "communications subsystem" in FIG. 6. In addition, in FIG. 9, the part of memory space A1' of the "application subsystem" further includes a part of memory space denoted as "dynamically allocated" S1. As the name implies, a size of this part of "dynamically allocated" memory space S1 can be adjusted dynamically. This part of "dynamically allocated" memory space S1 may be used to represent the memory space S1 allocated by the main operating system to the communications subsystem in the first memory management mechanism. In addition, in the memory space S1, a part of memory space S2 is further shown to represent the part of memory space S2 pre-allocated to the component of the communications subsystem in the second memory management mechanism.

Because both the dynamically allocated memory space S1 and the fixedly allocated memory space C1' are used by the communications subsystem, the fixedly allocated memory space C1' in FIG. 9 may be considerably less than the fixedly allocated memory space C1 in FIG. 6. In addition, because the size of the memory space S1 may be adjusted dynamically, when a wireless communication data rate is comparatively low, the size of the memory space S1 may be reduced correspondingly. From a statistical perspective, a sum of memory capacities of S1 and C1' is still less than that of the fixedly allocated memory space C1 in FIG. 6. Therefore, a waste of memory space can be reduced.

A phenomenon of reducing such a waste of memory space is shown on the right part of FIG. 9. A thin solid line represents a memory capacity that is fixedly allocated to the communications subsystem originally and that is shown in FIG. 6, and is still denoted as C1. A thin dashed line represents a memory capacity actually used by the communications subsystem, and is still denoted as C2. A bold solid line represents the memory capacity S1 that is dynamically allocated to the communications subsystem when the foregoing first memory management mechanism is used. A dotted line represents the memory capacity C1' that is fixedly allocated to the communications subsystem when the foregoing first memory management mechanism is used. It can be learned from FIG. 9 that, between moments t1' and t2', the memory capacity S1 dynamically allocated to the communications subsystem may be dynamically adjusted with a change of the memory capacity C2 actually used by the communications subsystem. In addition, in most cases, a sum of the memory capacity S1 dynamically allocated to the communications subsystem and the memory capacity C1' fixedly allocated to the communications subsystem is less than the fixedly allocated memory capacity C1.

It should be understood that, in this embodiment of this application, an MMA subsystem may use both the foregoing two memory management mechanisms to form a two-level memory management solution. The foregoing first memory management mechanism is used in a level-1 memory management solution, and the foregoing second memory management mechanism is used in a level-2 memory management solution.

In addition, the MMA subsystem may use only one of the memory management mechanisms. In an optional implementation, the MMA subsystem interacts with an application subsystem based on the first memory management mechanism, and may adjust the size of the dynamic memory space S1. This part of memory space may be allocated in the communications subsystem by the communications operating system. This optional implementation can reduce memory capacity overheads, system power consumption, and a service delay of the communications subsystem. In another optional implementation, the MMA subsystem may manage memory space statically reserved for or fixedly allocated to the communications subsystem, and use the second memory management mechanism to partially replace a memory management function of the communications operating system. The MMA subsystem pre-allocates a part of memory to a component of the communications subsystem, or MMA hardware replaces the communications operating system software to perform memory allocation, so that a memory allocation speed of the communications subsystem can be increased.

Figure 10:
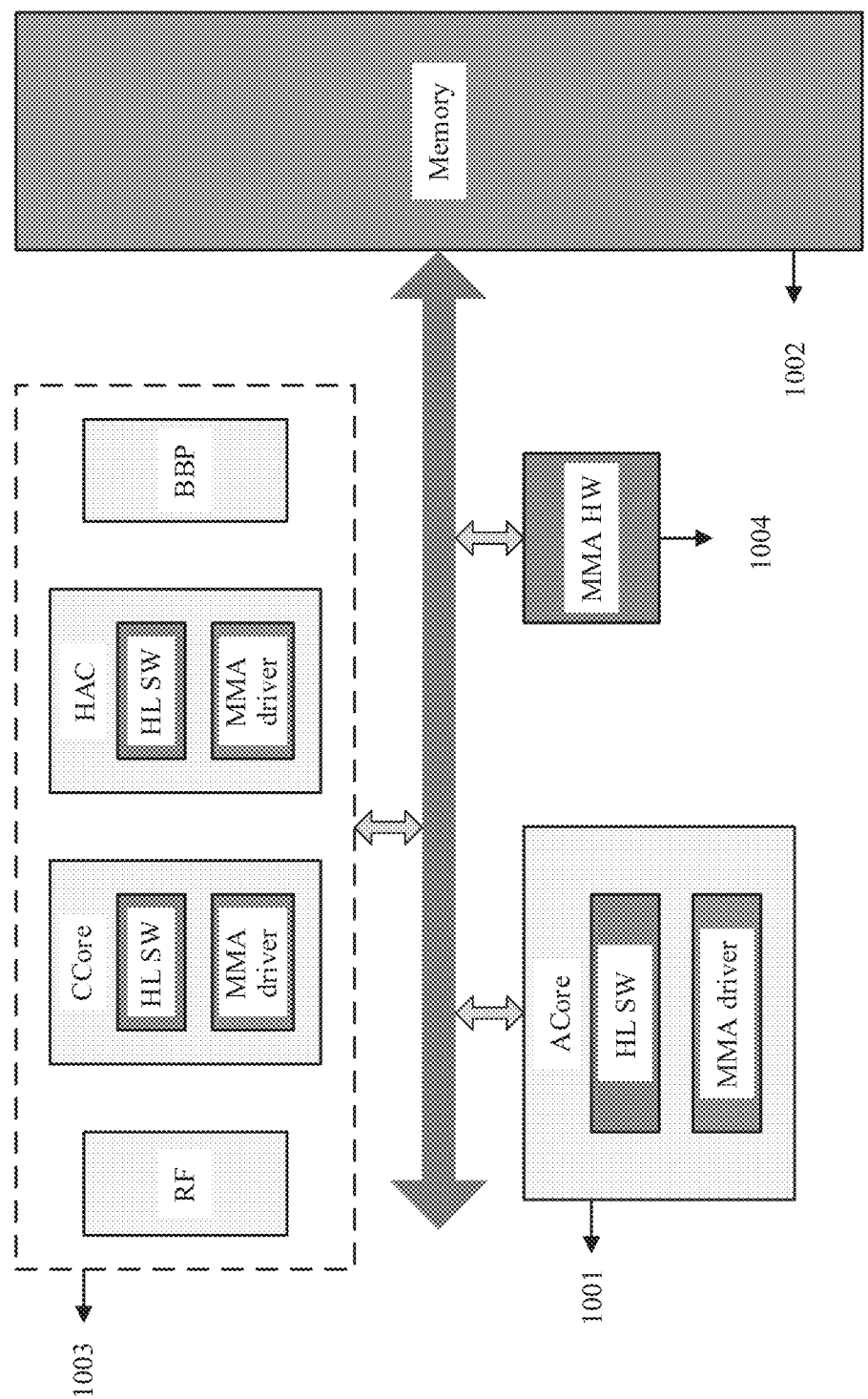
FIG. 10 is a schematic structural diagram of still another wireless communications device according to an embodiment of this application.

FIG. 10 is a schematic structural diagram of still another wireless communications device according to an embodiment of this application. The wireless communications device further describes some optional implementations of this embodiment of this application based on the memory management accelerator of the wireless communications device shown in FIG. 7. For related details, refer to the foregoing descriptions. Repeated content is not described again.

As shown in FIG. 10, MMA hardware (HW) 1004 and a plurality of MMA drivers distributed in an application subsystem 1001 and a communications subsystem 1003 jointly form an MMA subsystem. It should be understood that, for brevity, no MMA driver is shown in the MMA hardware 1004. In this embodiment of this application, the MMA hardware may still include an MMA driver and higher-level software that enable the MMA hardware to work. These MMA drivers may be configured to cooperate with the MMA hardware to implement the memory management solutions, and in particular, the memory management method, provided in the embodiments of this application.

Higher-level software (HL SW) and an MMA driver are shown in each of an ACore of the application subsystem 1001, and a CCore and an HAC of the communications subsystem 1003. The MMA driver may be considered as lower-layer software or underlying software, and may provide an interface for interaction between the higher-level software and the underlying hardware. It should be understood that each of the ACore, the CCore, and the HAC may include different higher-level software and a different MMA driver. For example, the higher-level software in the ACore may represent a main operating system and various applications that are run in the ACore, the higher-level software in the CCore may represent a communications operating system and a communication function software program that are run in the CCore, and the higher-level software in the HAC may represent a software program that is run in the hardware accelerator. The MMA driver in the ACore of the application subsystem 1001 may provide, for the higher-level software of the application subsystem, an interface used to interact with the MMA hardware. Similarly, the MMA driver in each of the CCore and the HAC of the communications subsystem 1003 may provide, for corresponding higher-level software, an interface used to interact with the MMA hardware. These MMA drivers may not be completely the same.

The main operating system that is run in the ACore of the application subsystem 1001, for example, an Android operating system or an iPhone operating system, may dynamically allocate a part of memory space, denoted as S1, to the communications subsystem 1003 from memory space managed by the application subsystem. The part of memory space S1 is managed by the MMA subsystem. Correspondingly, in an implementation, the MMA driver in the ACore may include: a prestorage (prestore) module, configured to prestore a memory to the MMA subsystem, and a reclaim module, configured to reclaim a memory from the MMA subsystem.

In this embodiment of this application, the memory space may be identified based on a memory address. In addition, the memory space may correspond to a plurality of memory addresses, and each memory address may correspond to a part of the memory space. One memory address may represent a segment of single-byte or multi-byte memory space. The memory address may be a memory address corresponding to the first byte in a segment of multi-byte memory space. A specific quantity of bytes may be determined based on another parameter, such as a level or type of the memory address. The memory space corresponding to the memory address may be uniquely determined based on a start address of the memory space and a length of the memory space. In addition, a segment of memory space may be determined without another parameter. It is assumed that sizes of memory space corresponding to some memory addresses are each set to a specific quantity of bytes by default, for example, 128 bytes. In this case, each of these memory addresses may uniquely determine a segment of 128-byte memory space.

In a computer system, memory may be organized as an array in bytes. Each byte in the memory may have a unique corresponding physical address (PA). Naturally, a memory access manner is to use a physical address directly, and this manner is denoted as physical addressing. In addition, a memory may be accessed by using a virtual addressing scheme. When the virtual addressing scheme is used, each byte in the memory may have one virtual address (VA) corresponding to a physical address. When a virtual address is used to access the memory, the virtual address is converted into a corresponding physical address before being sent to the memory. A task of translating a virtual address into a physical address may be referred to as address translation.

Currently, hardware referred to as a memory management unit (MMU) and a data structure referred to as a page table are usually used in a computer system to implement an address translation function. The MMU, sometimes referred to as a paged memory management unit (PMMU), is hardware configured to process translation of between a virtual address and a physical address. The page table, sometimes referred to as a subpage table, is a data structure used to indicate a mapping relationship or a correspondence between a virtual address and a physical address.

It should be understood that, in this embodiment of this application, the memory space may be a segment of physically continuous memory space in the memory, or may be a segment of physically discontinuous memory space in the memory. The memory address may be a physical address of the memory, or may be a virtual address of the memory. When the memory address is a virtual address of the memory, the wireless communications device in this embodiment of this application may further include a hardware component, a software component, and the like that are configured to implement an address translation function, for example, an MMU and a page table. Correspondingly, the hardware component and the software component that are configured to implement the address translation function may further cooperate with the memory management accelerator provided in this embodiment of this application, to provide the address translation function for the memory management accelerator.

In the computer system, the term pointer is usually used to indicate a memory address. In a computer science context, a pointer may be understood as an object or a variable of a programming language, and the object or the variable is used to represent or store a memory address. A value of the pointer is a memory address, which is equivalent to that the pointer points to a specific location in the memory. Memory space corresponding to the memory address represented by the pointer may be used to store application data such as a video and a text. In this embodiment of this application, two terms "pointer" and "memory pointer" are used without distinction to indicate the memory address in the memory management solution provided in the embodiments of this application.

In this embodiment of this application, there may be a plurality of different types (type) or levels of memory pointers. Pointers of a same type or level correspond to memory space of a same size or granularity, and pointers of different types or levels correspond to memory space of different sizes or granularities. For example, there may be three levels of memory pointers. A memory pointer at a first level corresponds to memory space with a memory size of 256 bytes, a memory pointer at a second level corresponds to memory space with a memory size of 512 bytes, and a memory pointer at a third level corresponds to memory space with a memory size of 1024 bytes. Only a memory address of a start byte in corresponding memory space (for example, 256 bytes) may be stored in a memory pointer at each level (for example, at the first level). The memory address of the start byte can uniquely determine this segment of memory space with reference to the memory size corresponding to the level of the memory pointer. Only a memory address of a start byte is stored in a memory pointer, and this helps reduce a size of the memory pointer, thereby saving storage space required for storing the memory pointer. It should be understood that the memory pointer herein is merely an example. In this embodiment of this application, the memory pointer may alternatively be implemented in another possible implementation, for example, by adjusting a quantity of levels of memory pointers, adjusting a memory size corresponding to a level of the memory pointer, or adjusting a memory address stored in the memory pointer.

Based on a concept of a memory pointer, the main operating system that is run in the ACore of the application subsystem 1001 may first prestore some memory pointers for the MMA subsystem, and then correspondingly make a supplement with some memory pointers or reclaim some memory pointers, according to a notification or a request of the MMA subsystem, for example, an interrupt request (IRQ). The interrupt request may be a hardware interrupt request, or may be a software interrupt request. That the main operating system makes a supplement with some memory pointers means that the main operating system sends some more memory pointers to the MMA subsystem, to increase a size of memory space available for the communications subsystem. That the main operating system reclaims some memory pointers means that the main operating system receives some memory pointers from the MMA subsystem. Memory space corresponding to these memory pointers reclaimed from the MMA subsystem may be reallocated by the main operating system, for example, to another subsystem or application, or certainly may be allocated to the communications subsystem again.

For ease of description, these memory pointers that are prestored by the main operating system for the MMA subsystem and with which the main operating system supplements the MMA subsystem may be denoted as a pointer group 1, and the pointer group 1 may correspond to the memory space S1 dynamically allocated by the main operating system to the communications subsystem. The pointer group 1 may include a plurality of different levels of memory pointers, and there may be a plurality of memory pointers at each level. Each memory pointer is used to indicate a segment of memory space in the memory space S1. As an example, the pointer group 1 may include one or more levels of memory pointers corresponding to 64 bytes (B), 128 B, 256 B, 512 B, 1024 B (1 KB), 2 KB, 4 KB, 8 KB, or 16 KB. It should be understood that using different levels of memory pointers helps provide memories of different granularities accurately in a more timely manner, to meet a requirement of the communications subsystem.

In an optional implementation, the pointer group 1 may be stored in a memory 1002 of the wireless communications device, and the MMA subsystem is connected to the memory 1002 through an interconnect bus. In another optional implementation, the pointer group 1 may alternatively be stored in a built-in memory of the MMA subsystem. The built-in memory may be a memory, such as a TCM or a register, that is built in the MMA hardware. In comparison, using the former optional implementation can reduce overheads of a built-in memory in the MMA subsystem, while using the latter optional implementation can further improve a capability of managing the pointer group 1 by the MMA subsystem, thereby accelerating a memory allocation rate.

The MMA subsystem may denote some memory pointers in the pointer group 1 as a pointer subgroup 11, and send or push the some memory pointers to some components of the communications subsystem 1003 in advance. The pointer subgroup 11 may correspond to memory space S2 preallocated by the MMA subsystem to the some components of the communications subsystem. These components may be denoted as a communications component CC, for example, the CCore and the HAC. When having a memory use requirement, the communications component CC may directly use memory corresponding to the pointer subgroup 11, without applying to the communications operating system for memory, thereby accelerating a memory allocation speed. Correspondingly, a memory, for example, a TCM or a register, may alternatively be disposed inside these components (for example, the CCore and the HAC) of the communications subsystem 1003, to store the some memory pointers pushed by the MMA subsystem. An MMA driver of each of these components (for example, the CCore and the HAC) of the communications subsystem 1003 may maintain a memory pointer in a corresponding built-in memory, and is responsible for providing, for corresponding higher-level software, memory required for processing various data.

Certainly, the MMA hardware may still reserve some memory pointers in the pointer group 1, which are denoted as a pointer subgroup 12. The pointer subgroup 12 may be stored in a memory of the MMA hardware, for example, a TCM or a register of the MMA hardware, without being sent or pushed to the communications subsystem 1003 in advance. Other components of the communications subsystem 1003 may be denoted as a communications component CC2 (for example, a BBP). When having a memory use requirement, the communications component CC2 may obtain the memory pointers in the pointer subgroup 12 by accessing the MMA hardware, for example, the TCM or the register of the MMA hardware. These components of the communications subsystem 1003 obtain a memory by accessing the MMA hardware, without applying to the communications operating system for the memory. Therefore, a memory allocation speed can also be accelerated. Correspondingly, a related communications interface circuit, register, and software component, and the like may alternatively be disposed inside these components (for example, the BBP) of the communications subsystem 1003 and the MMA hardware separately, to satisfy a requirement of these components of the communications subsystem 1003 for accessing the MMA hardware.

It should be understood that maintaining these memory pointers by the MMA subsystem can accelerate a memory allocation rate of a component of the communications subsystem. Both the communication component CC that obtains the memory pointers in advance and the communication component CC2 that obtains the memory pointers by accessing the MMA hardware can benefit from the operation of maintaining the memory pointers by the MMA subsystem. Therefore, in this embodiment of this application, the MMA subsystem manages dynamic memory space allocated by the main operating system to the communications subsystem, and partially replaces a memory management function of the main operating system or the communications operating system, so that a memory allocation rate can be increased, and a low-delay requirement of a wireless communications service can be better met, thereby improving performance of the wireless communications device.

After the foregoing memory pointers have been used by the components of the communications subsystem, the used memory pointers may continue to be reserved in the original pointer group or pointer subgroup, or may be grouped into a new pointer group or pointer subgroup. For example, after a specific memory pointer in the pointer subgroup 11 has been used, the memory pointer may continue to be reserved in the pointer subgroup 11. Alternatively, the memory pointer may be grouped into a new pointer subgroup that is denoted as, for example, a pointer subgroup 21. The memory pointers in the pointer subgroup 11 may be denoted as allocated and to-be-used memory pointers. These memory pointers have been allocated to a component of the communications subsystem, for use by the component at any time. The memory pointers in the pointer subgroup 21 may be denoted as used and to-be-released memory pointers. These memory pointers have been used by a component of the communications subsystem, may be released by the component, and are reclaimed by the MMA subsystem from the component.

Similarly, these memory pointers reclaimed from the component of the communications subsystem to the MMA subsystem may be reserved in the original pointer group, or may be grouped into a new pointer group that is denoted as, for example, a pointer group 2. Memory pointers in the pointer group 1 may be denoted as preliminarily-allocated and to-be-finally-allocated memory pointers. These memory pointers have been preliminarily allocated by the main operating system to the MMA subsystem, and are to be finally allocated by the MMA subsystem to a component of the communications subsystem. Memory pointers in the pointer group 2 may be denoted as preliminarily-reclaimed and to-be-finally-reclaimed memory pointers. These memory pointers have been preliminarily recycled from a component of the communications subsystem to the MMA subsystem, and may be finally reclaimed by the main operating system from the MMA subsystem.

In comparison, if a memory pointer that has been used by a component of the communications subsystem is grouped into a new pointer subgroup or a new pointer group other than an original pointer subgroup or pointer group, the grouping helps increase a memory reclamation rate, and reduce memory capacity overheads. If a memory pointer that has been used by a component of the communications subsystem is reserved in an original pointer subgroup or pointer group, the reservation helps reduce calculation overheads required for memory reclamation and memory reallocation.

It should be understood that, in this embodiment of this application, for ease of description, a set of memory pointers allocated or reclaimed by the MMA subsystem is denoted as a pointer group, and a set of memory pointers allocated or reclaimed by a component of the communications subsystem is denoted as a pointer subgroup. The pointer group or pointer subgroup may also have other names. For example, the pointer group is also referred to as a pointer set, a pointer resource pool, a large pointer resource pool, a large memory pointer set, or the like. The pointer subgroup is also referred to as a pointer subset, a pointer resource subpool, a small pointer resource pool, a small memory pointer set, or the like.

In this embodiment of this application, memory pointer storage and management exert direct impact on an effect of the memory management solution. A quantity of memory pointers in a pointer group is usually greater than a quantity of memory pointers in a pointer subgroup. Correspondingly, a capacity requirement of a memory configured to store a pointer group is usually greater than a capacity requirement of a memory configured to store a pointer subgroup. With reference to the accompanying drawings, the following further describes a memory pointer storage and management solution provided in the embodiments of this application.

In an optional implementation, a memory configured to store memory pointers in a pointer group may be a built-in memory of the MMA subsystem, for example, the TCM or the register of the MMA hardware. Specifically, all the memory pointers in the pointer group may be stored in the built-in memory of the MMA subsystem.

In another optional implementation, a memory configured to store the memory pointers in the pointer group may be a lower-level memory of the MMA subsystem, for example, a memory of the wireless communications device. All the memory pointers in the pointer group may be stored in the memory. The built-in memory of the MMA subsystem does not need to store all the memory pointers in the pointer group. The built-in memory of the MMA subsystem may be configured to store status information of the pointer group. For example, the status information may be used to indicate an empty state or a full state of the pointer group, may be used to indicate a location of a memory pointer in the pointer group, or the like. In addition, the built-in memory of the MMA subsystem can further store a small quantity of memory pointers in the pointer group.

In comparison, when the former optional implementation is used, because the memory pointer is directly stored in the built-in memory of the MAA subsystem, for example, the TCM or the register, without considering a memory access conflict or memory access overheads, a memory allocation rate can be increased. Due to comparatively high costs per unit capacity of the TCM or the register, when the latter optional implementation is used, the MMA subsystem may choose to use a TCM or a register with a comparatively small capacity, to reduce costs of the MMA subsystem.

On this basis, considering a comparatively small requirement for a storage capacity of a pointer subgroup, all the memory pointers in the pointer subgroup may be stored in a built-in memory of the component of the communications subsystem, for example, a TCM or a register. However, all memory pointers in the pointer subgroup may alternatively be stored in the built-in memory of the MMA subsystem or a memory of the wireless communications device. The built-in memory of the component of the communications subsystem may be configured to store status information of the pointer subgroup. For example, the status information may be used to indicate an empty state or a full state of the pointer subgroup, may be used to indicate a location of a memory pointer in the pointer subgroup, or the like. In addition, the built-in memory of the component of the communications subsystem can further store a small quantity of memory pointers in the pointer group.

In an optional implementation, when memory pointers in a pointer group and a pointer subgroup are specifically stored in a memory, a data structure of a cyclic buffer may be used. The cyclic buffer is also referred to as a circular buffer, a circular queue, or a ring buffer. The cyclic buffer is a data structure that is used to indicate a buffer with a fixed size and connected head and tail, and is suitable for buffering a data stream. The cyclic buffer usually requires four pointers: one at an actual start location in the memory, one at an actual end location in the memory that may alternatively be replaced by a buffer length, one at a start position (read pointer) of valid data stored in a buffer, and one at an end position (write pointer) of the valid data stored in the buffer. In this case, the read pointer and the write pointer of the cyclic buffer may be used to indicate an empty state or a full state of a pointer group or a pointer subgroup and a location of an available memory pointer.

It should be understood that, in this embodiment of this application, storing the status information of the pointer group or the pointer subgroup and storing all the memory pointers of the pointer group or the pointer subgroup do not conflict with each other, and may be combined. Even if a memory stores all memory pointers in a pointer group or a pointer subgroup, the memory may still store status information of the pointer group or the pointer subgroup. In addition, even if a memory does not store a memory pointer in a pointer group or a pointer subgroup, the memory may still store status information of the pointer group or the pointer subgroup. For example, the built-in memory of the MMA system may also be configured to store status information of one or more pointer subgroups, to find an empty state or a full state of the pointer subgroup in a timely manner. When the MMA subsystem finds that a specific pointer subgroup (for example, the pointer subgroup 12) is in an "empty" state, the MMA subsystem may supplement the pointer subgroup with a memory pointer in a timely manner. When the MMA subsystem finds that a specific pointer subgroup (for example, the pointer subgroup 21) is in a "full" state, the MMA subsystem may reclaim a memory pointer from the pointer subgroup in a timely manner.

Figure 11:
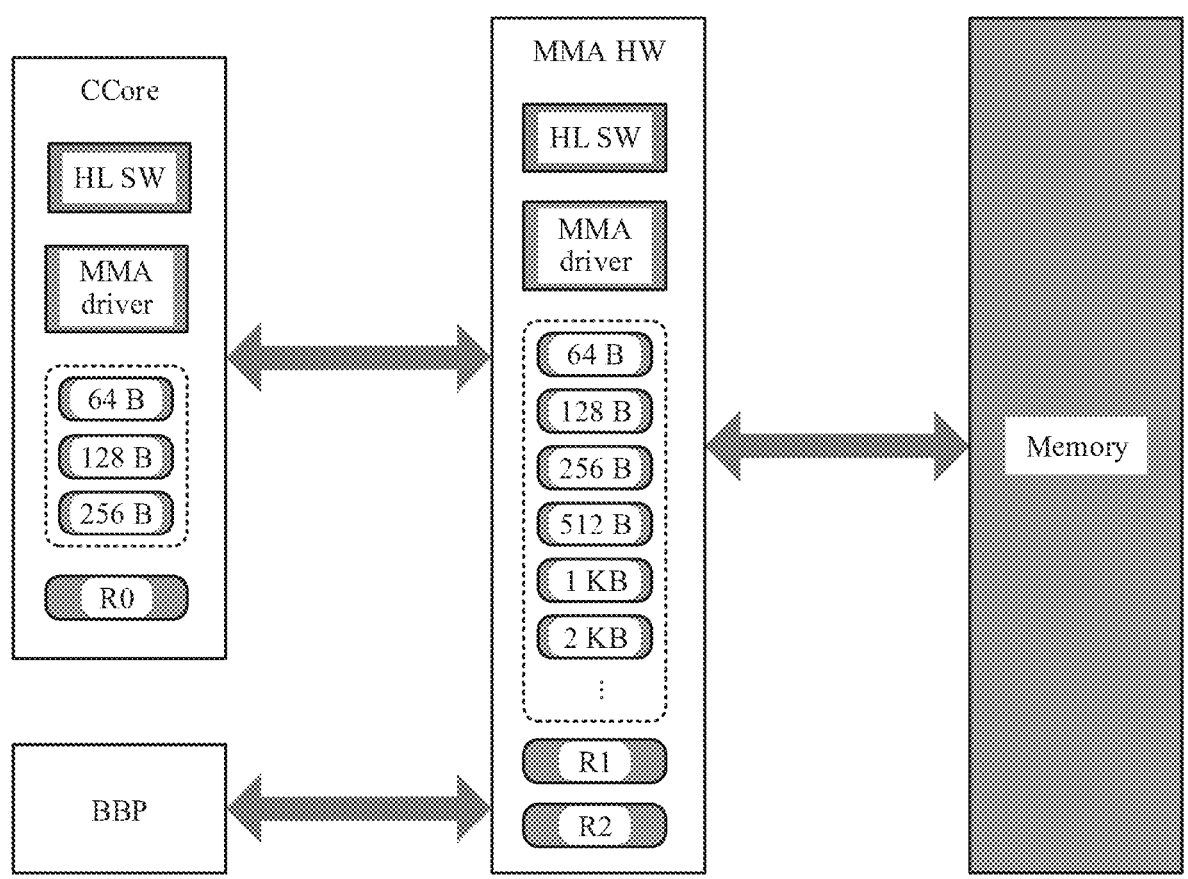
FIG. 11 is a schematic diagram of storage of a memory pointer according to an embodiment of this application.

FIG. 11 is a schematic diagram of storage of a memory pointer according to an embodiment of this application. The wireless communications device may be the wireless communications device shown in FIG. 7 or FIG. 10. The wireless communications device may store a memory pointer in a pointer group in the foregoing former optional implementation. As shown in FIG. 11, the pointer group is stored in MMA hardware, and a pointer subgroup is stored in a component (for example, a CCore) of a communications subsystem. The pointer group may be the pointer group 1 in the foregoing embodiment, may be the pointer group 2, or may be the pointer group 1 and the pointer group 2. The pointer subgroup may be the pointer subgroup 11 in the foregoing embodiment, may be the pointer subgroup 21, or may be the pointer subgroup 11 and the pointer subgroup 21.

In FIG. 11, a dashed-line box in the MMA hardware is used to represent the memory pointer in the pointer group, and may correspond to a TCM, a register, or another on-chip storage device in the MMA hardware. The pointer group may include a plurality of memory pointers of different levels. The pointer group shown in FIG. 11 includes different levels of memory pointers corresponding to memory sizes of 64 B, 128 B, 256 B, 512 B, 1 KB, and 2 KB. Two registers are further shown in the MMA hardware and are denoted as R1 and R2. R1 and R2 may represent some of a plurality of registers in the MMA hardware. R1 may be configured to store status information of the pointer group, and R2 may be configured to store status information of the pointer subgroup. In addition, higher-level software and an MMA driver are also shown in the MMA hardware. The higher-level software and the MMA driver in the MMA hardware may be configured to manage the memory pointers in the pointer group, for example, monitor an empty or full state of the pointer group and an empty or full state of the pointer subgroup, and supplement or reclaim a memory pointer in a timely manner.

A dashed-line box in the CCore is used to indicate the memory pointer in the pointer subgroup, and may correspond to a TCM, a register, or another on-chip storage device in the CCore. The pointer subgroup may also include a plurality of different levels of memory pointers. FIG. 11 shows that the pointer subgroup includes a plurality of levels of memory pointers corresponding to memory sizes of 64 B, 128 B, and 256 B. A register denoted as R0 is further shown in the CCore. R0 may represent some of a plurality of registers in the CCore. R0 may also be used to store status information of the pointer subgroup. In addition, higher-level software and an MMA driver are also shown in the CCore. The higher-level software and the MMA driver in the CCore may be configured to manage the memory pointers in the pointer subgroup, for example, use a memory pointer based on a memory requirement of software and hardware of the CCore, monitor an empty or full state of the pointer subgroup, and indicate an MMA subsystem in a timely manner to supplement or reclaim a memory pointer.

Figure 12:
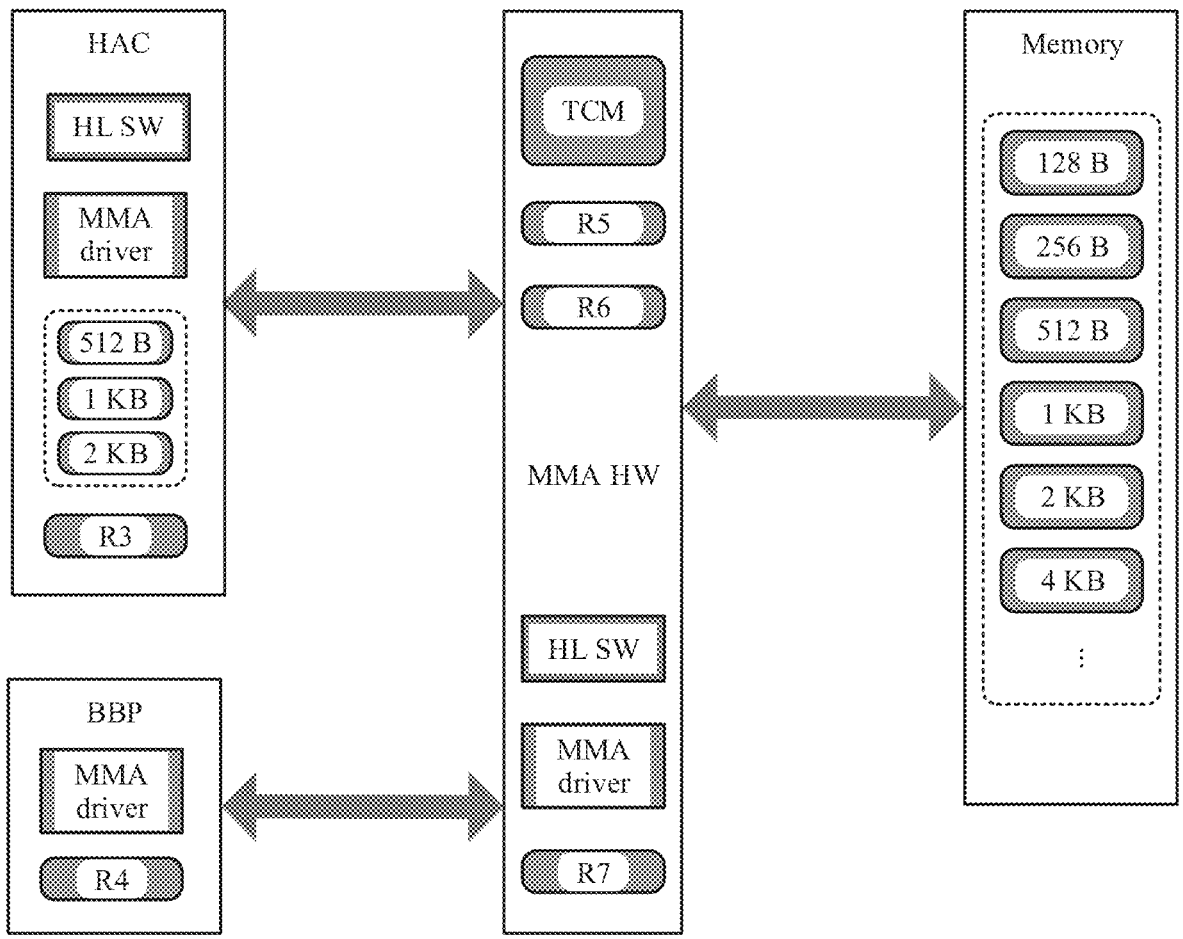
FIG. 12 is a schematic diagram of storage of another memory pointer according to an embodiment of this application.

FIG. 12 is a schematic diagram of storage of another memory pointer according to an embodiment of this application. The wireless communications device may be the wireless communications device shown in FIG. 7 or FIG. 10. The wireless communications device may store a memory pointer in a pointer group in the foregoing latter optional implementation. As shown in FIG. 12, the pointer group is stored in a memory, and a pointer subgroup is stored in a component (for example, an HAC) of a communications subsystem. The pointer group may be the pointer group 1 in the foregoing embodiment, may be the pointer group 2, or may be the pointer group 1 and the pointer group 2. The pointer subgroup may be the pointer subgroup 11 in the foregoing embodiment, may be the pointer subgroup 21, or may be the pointer subgroup 11 and the pointer subgroup 21.

In FIG. 12, a dashed-line box in a memory is used to indicate a memory pointer in a pointer group. The pointer group may include a plurality of memory pointers of different levels. FIG. 12 shows that the pointer group includes different levels of memory pointers that correspond to memory sizes of 128 B, 256 B, 512 B, 1 KB, 2 KB, and 4 KB.

A dashed-line box in an HAC is used to indicate the memory pointer in the pointer subgroup. The pointer subgroup may also include a plurality of different levels of memory pointers. FIG. 12 shows that the pointer subgroup includes a plurality of levels of memory pointers corresponding to memory sizes of 512 B, 1 KB, and 2 KB. A register, denoted as R3, is also shown in the HAC. R3 may represent some of a plurality of registers in the HAC. R3 may also be used to store status information of the pointer subgroup.

An MMA driver and a register that are denoted as R4 are further shown in a BBP. R4 may represent some of a plurality of registers in the BBP. The MMA driver and the register R4 may be configured to support the BBP in directly accessing MMA hardware, to obtain a memory pointer in a pointer group 1.

Higher-level software, an MMA driver, a TCM, and three registers denoted as R5, R6, and R7 are shown in MMA hardware. R5, R6, and R7 may represent some of a plurality of registers in the MMA hardware. R5 may be configured to store status information of the pointer group, and R6 may be configured to store the status information of the pointer subgroup. R7 may be configured to store some status information required by some components (for example, the BBP) of the communications subsystem to access the MMA hardware. The TCM may be configured to store some memory pointers in the pointer group stored in the memory. These memory pointers may correspond to the pointer subgroup 12 in the foregoing embodiment, and may be obtained by some components (for example, the BBP) of the communications subsystem by accessing the MMA hardware.

Based on the computing device, the wireless communications device, and the MMA hardware and the MMA driver of the MMA subsystem provided in the foregoing embodiments, the embodiments of this application further provide some memory management methods. These memory management methods may be implemented by a hardware component, or may be implemented by a software component, or may be implemented through cooperation of a hardware component and a software component. When software components, for example, the higher-level software in the MMA hardware and a plurality of MMA drivers distributed in an application subsystem, the communications subsystem, and the MMA hardware need to be used for these memory management methods, these memory management methods may represent algorithms of software programs, and steps of the methods may represent functional modules of the algorithms.

Figure 13:
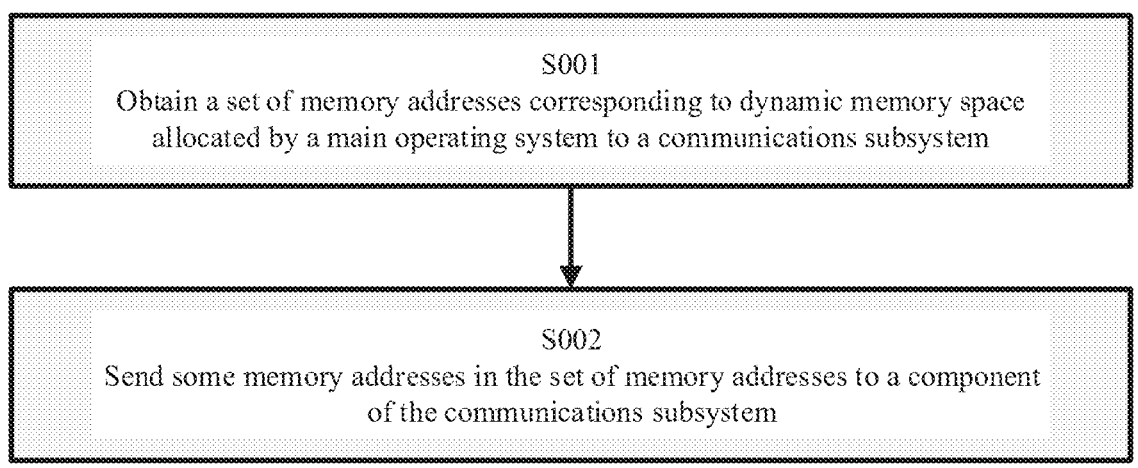
FIG. 13 is a schematic flowchart of a memory management method according to an embodiment of this application.

FIG. 13 is a schematic flowchart of a memory management method according to an embodiment of this application. The memory management method may be executed by the MMA subsystem in the foregoing embodiment. The MMA subsystem is coupled to an application subsystem and a communications subsystem. The application subsystem is configured to run a main operating system, and the communications subsystem is configured to run a communications operating system. Because the MMA subsystem may be completely or partially integrated into the communications subsystem or the application subsystem, it may also be considered that the method is performed by the baseband chip, the SoC chip, or the wireless communications device in the foregoing embodiments.

As shown in FIG. 13, the method includes the following steps.

S001: Obtain a set of memory addresses corresponding to dynamic memory space allocated by the main operating system to the communications subsystem, where the set of memory addresses includes one or more memory addresses.

S002: Send some memory addresses in the set of memory addresses to a component of the communications subsystem.

Step S002 may include at least one of the following two optional solutions: periodically sending some memory addresses in the set of memory addresses to the component of the communications subsystem, or sending some memory addresses in the set of memory addresses to the component of the communications subsystem based on triggering of a first event.

It should be understood that the two optional solutions do not conflict with each other, and may be used in a combination manner. For example, the former operation of periodically sending the memory addresses is used as a conventional operation, and the latter operation of sending the memory addresses based on triggering of an event is used as a supplementary operation. An operation whose condition is satisfied first is performed first.

Specifically, the first event may include one or more of the following plurality of events:

a quantity of memory addresses in the component of the communications subsystem being less than a first lower threshold, a first hardware interrupt request from the component of the communications subsystem, and a first software interrupt request from the component of the communications subsystem.

It should be understood that there may alternatively be a plurality of first hardware interrupt requests, and each first hardware interrupt request has a corresponding hardware interrupt number. Different hardware interrupt numbers may correspond to different operations of the memory management apparatus, for example, sending different quantities of memory addresses. Different components of the functional subsystem may correspond to different first memories. In addition, different first memories may correspond to different first hardware interrupt requests, that is, have different hardware interrupt numbers. There may alternatively be a plurality of first software interrupt requests, and each first software interrupt request has a corresponding software interrupt number.

Figure 14:
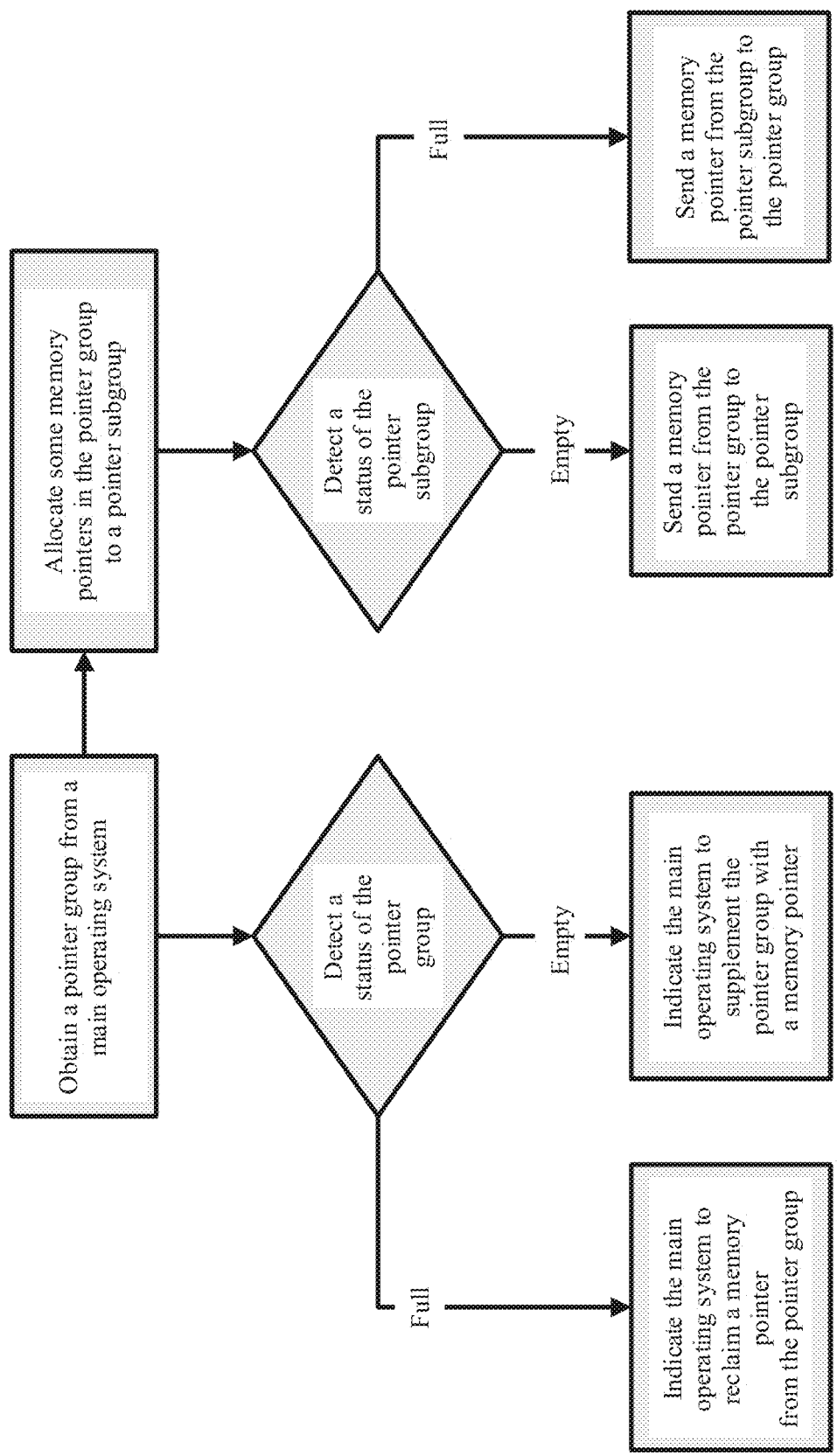
FIG. 14 is a schematic flowchart of another memory management method according to an embodiment of this application.

FIG. 14 is a schematic flowchart of another memory management method according to an embodiment of this application. The memory management method may be performed by the MMA subsystem in the foregoing embodiment, for example, performed by MMA hardware and an MMA driver collaboratively. A memory address is represented by a memory pointer, a set of memory addresses corresponds to a pointer group, and memory addresses sent to a component of the communications subsystem correspond to a pointer subgroup.

As shown in the figure, the MMA subsystem allocates some memory pointers in the pointer group to the pointer subgroups after obtaining the pointer group from a main operating system. Then, to ensure a proper quantity of memory pointers in the pointer group and a proper quantity of memory pointers in the pointer subgroup, the MMA subsystem may detect a status of the pointer group and a status of the pointer subgroup. That the statuses of the pointer group and the pointer subgroup include an "empty" state and a "full" state is used as an example. When a state of the pointer group is "empty", the MMA subsystem indicates the main operating system to supplement the pointer group with a memory pointer. When a state of the pointer group is "full", the MMA subsystem indicates the main operating system to reclaim a memory pointer from the pointer group. In addition, when a state of the pointer subgroup is "empty", the MMA subsystem sends a memory pointer from the pointer group to the pointer subgroup. When a state of the pointer subgroup is "full", the MMA subsystem sends a memory pointer from the pointer subgroup to the pointer group.

It should be understood that, in this embodiment of this application, the "empty" state does not require that a quantity of memory pointers in the pointer group or the pointer subgroup is 0. The "empty" state may indicate that the quantity of memory pointers in the pointer group or the pointer subgroup is less than a specific lower threshold or specific lower thresholds. Correspondingly, the "full" state may indicate that the quantity of memory pointers in the pointer group or the pointer subgroup is greater than a specific upper threshold or specific upper thresholds. Different pointer groups and different pointer subgroups may have respective thresholds, and each pointer group or each pointer subgroup may have a plurality of thresholds including a plurality of upper thresholds and a plurality of lower thresholds. In addition, it should be understood that a condition (for example, a lower threshold or an upper threshold) for determining a state (for example, an empty state or a full state) of a pointer group may be different from a condition for determining a state of a pointer subgroup.

For example, if a quantity of memory pointers in a specific pointer group is less than 30%, it may be considered that the pointer group is in an "empty" state. If a quantity of memory pointers in the pointer group is greater than 80%, it may be considered that the pointer group is in a "full" state. If a quantity of memory pointers in the pointer group is between 30% and 80%, it may be considered that the pointer group is in another state, for example, a "proper" state. If a quantity of memory pointers in a specific pointer subgroup is less than 50%, it may be considered that the pointer subgroup is in a "empty" state. If a quantity of memory pointers in the pointer subgroup is greater than 90%, it may be considered that the pointer subgroup is in a "full" state. If a quantity of memory pointers in the pointer subgroup is between 50% and 90%, it may be considered that the pointer subgroup is in another state, for example, a "proper" state.

It should be understood that the values herein are merely examples, and there may be other solutions in this embodiment of this application.

In the embodiments of this application and the accompanying drawings, the terms "first", "second", "third", "fourth", and the like are intended to distinguish between similar objects, but do not necessarily indicate a specific order or sequence. In addition, the terms "include", "have", and any other variants thereof are intended to indicate non-exclusive inclusions, for example, including a series of steps or units. The method, system, product, or device is not limited to the steps or units that are literally listed, but may include other steps or units that are not literally listed or that are inherent to these processes, methods, products, or devices.

It should be understood that, in this application, "at least one" means one or more, and "a plurality of" means two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" usually indicates an "or" relationship between the associated objects. "At least one item (piece) of the following" or a similar expression thereof means any combination of these items, including a single item (piece) or any combination of plural items (pieces). For example, at least one item (piece) of a, b, or c may indicate a, b, c, "a and b", "a and c", "b and c", or "a, b, and c", where a, b, and c may be singular or plural.

It should be understood that sequence numbers of the foregoing processes do not mean execution sequences in this application. The execution sequences of the processes should be determined according to functions and internal logic of the processes, and should not be construed as any limitation on the implementation processes of the embodiments of this application. The term "coupling" mentioned in this application is used to indicate interworking or interaction between different components, and may include a direct connection or an indirect connection performed by using another component.

All or some of the foregoing embodiments of this application may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedures or functions described in the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable or an optical fiber) or wireless (for example, infrared, radio, or microwave) manner. The computer-readable storage medium may be any usable medium accessible by a computer, or a data storage device, such as a server or a data center, integrating one or more usable media. The usable medium may be: a magnetic medium, for example, a floppy disk, a hard disk, or a magnetic tape; an optical medium, for example, a DVD; a semiconductor medium, for example, a solid-state drive (SSD); or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus, comprising:
an application subsystem including at least one hardware application processor, the at least one hardware application processor configured to run a main operating system in the application subsystem;
a communications subsystem including a radio frequency (RF) subsystem and at least one processing core, the at least one processing core configured to run a communications operating system; and
a memory management hardware accelerator, coupled to the application subsystem and the communications subsystem, and configured to:
obtain a set of memory addresses corresponding to dynamic memory space allocated by the main operating system to the communications subsystem, wherein the set of memory addresses comprise one or more memory addresses; and
send a subset of memory addresses in the set of memory addresses to a component of the communications subsystem.

2. The apparatus according to claim 1, wherein the component of the communications subsystem comprises a first memory, and wherein the first memory is configured to store at least one memory address received from the memory management hardware accelerator.

3. The apparatus according to claim 2, wherein the memory management hardware accelerator is configured to:
send the subset of memory addresses in the set of memory addresses to the first memory based on a category of the component of the communications subsystem.

4. The apparatus according to claim 2, wherein the memory management hardware accelerator is configured to:
periodically send the subset of memory addresses in the set of memory addresses to the first memory.

5. The apparatus according to claim 2, wherein the memory management hardware accelerator is configured to:
send the subset of memory addresses in the set of memory addresses to the first memory based on triggering of a first event.

6. The apparatus according to claim 5, wherein the first event comprises a quantity of memory addresses stored in the first memory being less than a first lower threshold.

7. The apparatus according to claim 5, wherein the first event comprises a first hardware interrupt request from the component of the communications subsystem.

8. The apparatus according to claim 1, wherein the component of the communications subsystem further comprises a second memory, and wherein the second memory is configured to store second at least one memory address that is received from the memory management hardware accelerator and that has been used by the component of the communications subsystem.

9. The apparatus according to claim 8, wherein the memory management hardware accelerator is further configured to:

receive, based on triggering of a second event, the second at least one memory address stored in the second memory.

10. The apparatus according to claim 9, wherein the second event comprises a second quantity of memory addresses stored in the second memory being greater than a second upper threshold.

11. The apparatus according to claim 10, wherein the second event comprises a second hardware interrupt request from the component of the communications subsystem.

12. The apparatus according to claim 1, wherein the subset of memory addresses in the set of memory addresses are stored in a built-in memory of the memory management hardware accelerator.

13. The apparatus according to claim 1, wherein the set of memory addresses are stored in a memory that is connected to the memory management hardware accelerator through an interconnect bus.

14. The apparatus according to claim 1, wherein a component of the memory management hardware accelerator and the component of the communications subsystem are integrated into a same chip.

15. The apparatus according to claim 1, wherein the component of the communications subsystem comprises at least one of the at least one processing core of the communications subsystem, a hardware accelerator of the communications subsystem, or at least one baseband processor of the communications subsystem.

16. The apparatus of claim 1, wherein the memory management hardware accelerator is external to the application subsystem, wherein the memory management hardware accelerator is external to the communications subsystem, and wherein the memory management hardware accelerator, the application subsystem, and the communications subsystem are coupled to one another through connecting to one another through an interconnect bus.

17. A method, comprising:
obtaining, by a memory management hardware accelerator, a set of memory addresses corresponding to dynamic memory space allocated by a main operating system in an application subsystem to a communications subsystem, wherein the set of memory addresses comprises one or more memory addresses, the memory management hardware accelerator is coupled to the application subsystem and the communications subsystem, the application subsystem is configured to run the main operating system, and the communications subsystem includes a radio frequency (RF) subsystem and at least one processing core configured to run a communications operating system; and
sending, by the memory management hardware accelerator, a subset of memory addresses in the set of memory addresses to a component of the communications subsystem.

18. The method according to claim 17, wherein the sending the subset of memory addresses in the set of memory addresses comprises:
sending, by the memory management hardware accelerator, the subset of memory addresses in the set of memory addresses to the component of the communications subsystem based on a category of the component of the communications subsystem.

19. The method according to claim 17, wherein the sending the subset of memory addresses in the set of memory addresses comprises:
periodically sending, by the memory management hardware accelerator, the subset of memory addresses in the set of memory addresses to the component of the communications subsystem.

20. The method according to claim 17, wherein the sending the subset of memory addresses in the set of memory addresses comprises:

sending, by the memory management hardware accelerator, the subset of memory addresses in the set of memory addresses to the component of the communications subsystem based on triggering of a first event.

21. The method according to claim 20, wherein the first event comprises a quantity of memory addresses in the component of the communications subsystem being less than a first lower threshold.

\* \* \* \* \*